US011899679B2

(12) United States Patent
Barman et al.

(10) Patent No.: US 11,899,679 B2
(45) Date of Patent: Feb. 13, 2024

(54) REMOTE DATA GATEWAY FOR USE WITH A DATA ANALYTICS WAREHOUSE

(71) Applicant: ORACLE INTERNATIONAL CORPORATION, Redwood Shores, CA (US)

(72) Inventors: Manish Barman, Bangalore (IN); Sambit Kumar Nanda, San Ramon, CA (US); Sunil Raj, Bangalore (IN)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 0 days.

(21) Appl. No.: 17/376,871

(22) Filed: Jul. 15, 2021

(65) Prior Publication Data

US 2022/0100751 A1 Mar. 31, 2022

Related U.S. Application Data

(60) Provisional application No. 63/083,318, filed on Sep. 25, 2020.

(51) Int. Cl.
*G06F 16/00* (2019.01)
*G06F 16/25* (2019.01)
(Continued)

(52) U.S. Cl.
CPC .......... *G06F 16/254* (2019.01); *G06F 9/5083* (2013.01); *G06F 16/245* (2019.01);
(Continued)

(58) Field of Classification Search
CPC .... G06F 16/254; G06F 9/5083; G06F 16/245; G06F 16/2455; G06F 16/248; G06F 16/283; H04L 67/1074; H04L 67/60
See application file for complete search history.

(56) References Cited

U.S. PATENT DOCUMENTS 8,639,792 B2  1/2014  Tamura
9,241,044 B2  1/2016  Shribman
(Continued)

OTHER PUBLICATIONS

Harvey, Rosie, Oracle® Cloud, "Connecting Oracle Analytics Cloud to Your Data" F25037-06, Jul. 2020, 77 pages.
(Continued)

*Primary Examiner* — Paul Kim
(74) *Attorney, Agent, or Firm* — TUCKER ELLIS LLP

(57) ABSTRACT

In accordance with an embodiment, described herein are systems and methods for providing a remote data gateway for use with an analytics environment, such as, for example, an Oracle Analytics Cloud environment, or a data warehouse or other type of analytics or computing environment. In accordance with an embodiment, the remote data gateway enables secure access by a data analytics warehouse operating in a cloud environment, to a customer's on-premise data, without migrating their on-premise data to the cloud. An on-premise data client exposes a port, which a data analytics remote data gateway server connects to, authenticates itself, and thereafter calls into the client periodically, via a remote data gateway agent, to check for subsequent requests, for example to provide on-premise data to the cloud environment, or to run data analytics on the on-premise data.

20 Claims, 23 Drawing Sheets

(51) Int. Cl.
   *G06F 16/245*      (2019.01)
   *H04L 67/1074*     (2022.01)
   *G06F 9/50*        (2006.01)
   *G06F 16/2455*     (2019.01)
   *G06F 16/28*       (2019.01)
   *G06F 16/248*      (2019.01)
   *H04L 67/60*       (2022.01)

(52) U.S. Cl.
   CPC ........ *G06F 16/248* (2019.01); *G06F 16/2455* (2019.01); *G06F 16/283* (2019.01); *H04L 67/1074* (2013.01); *H04L 67/60* (2022.05)

(56) References Cited

U.S. PATENT DOCUMENTS

| | | | |
|---|---|---|---|
| 9,866,635 | B2 | 1/2018 | Maturana |
| 10,338,973 | B2 | 7/2019 | Jubinski |
| 10,482,413 | B2 | 11/2019 | Paterra |
| 10,877,464 | B2 | 12/2020 | Chao |
| 10,951,539 | B2 | 3/2021 | Arakawa |
| 11,012,500 | B2 | 5/2021 | Dar |
| 11,169,507 | B2 | 11/2021 | Chao |
| 11,327,473 | B2 | 5/2022 | Sayyarrodsari |
| 11,741,120 | B2 | 8/2023 | Barman |
| 2011/0078297 | A1 | 3/2011 | Tamura |
| 2015/0067819 | A1 | 3/2015 | Shribman |
| 2015/0281356 | A1 | 10/2015 | Maturana |
| 2017/0090994 | A1 | 3/2017 | Jubinski |
| 2017/0178069 | A1 | 6/2017 | Paterra |
| 2018/0356792 | A1 | 12/2018 | Chao |
| 2018/0357334 | A1 | 12/2018 | Chao |
| 2019/0018394 | A1 | 1/2019 | Sayyarrodsari |
| 2019/0163173 | A1* | 5/2019 | Goldschmidt .......... H04L 63/00 |
| 2019/0361697 | A1 | 11/2019 | Hu |
| 2020/0036773 | A1 | 1/2020 | Dar |
| 2020/0097847 | A1 | 3/2020 | Convertino |
| 2020/0348968 | A1* | 11/2020 | Huchachar .............. G06F 9/445 |
| 2021/0044534 | A1 | 2/2021 | Arakawa |
| 2022/0100773 | A1 | 3/2022 | Barman |

OTHER PUBLICATIONS

Oracle, "Connecting Oracle Analytics Cloud to Your Data", Jul. 2020, 18 pages, retrieved from: <https://docs.oracle.com/en/cloud/paas/analytics-cloud/acsds/connect-premises-data-sources-using-data-gateway.html>.

Carley, Dayne, "Deploying Oracle Analytics Cloud Remote Data Gateway On Premise", Best Practices from Oracle Development's A-Team, Oct. 22, 2019, 8 pages.

Carley, Dayne, "Deploying Remote Data Gateway in Oracle Analytics Cloud for Data Visualization", Best Practices from Oracle Development's A-Team, Jul. 9, 2019, 4 pages.

Heise, Tanya, "Oracle Analytics Cloud (OAC) 5.4 is Released", EPM & BI Proactive Support Blog, Oct. 11, 2019, 3 pages, retrieved: <https://blogs.oracle.com/proactivesupportepm/oracle_analytics_cloud_54>.

Oracle, "Getting Started with Oracle Analytics Cloud", 2019, 7 pages, retrieved: <https://docs.oracle.com/en/cloud/paas/analytics-cloud/acsgs/what-is-oracle-analytics-cloud>.

Oracle, "What's New for Oracle Analytics Cloud", 2020, 35 pages, retrieved: <https://docs.oracle.com/en/cloud/paas/analytics-cloud/acswn/index.html>.

United States Patent and Trademark Office, Office Communication dated Oct. 6, 2022 for U.S. Appl. No. 17/376,879, 8 pages.

Chinnavelusamy, Dhamu; "Oracle Analytics Cloud With Data Gateaway", OneGlobe Data to Clarity, Jan. 6, 2020, 8 pages.

United States Patent and Trademark Office, Notice of Allowance and Fee(s) Due dated Jun. 28, 2023 for U.S. Appl. No. 17/376,879, 5 pages.

* cited by examiner

REMOTE DATA GATEWAY FOR USE WITH A DATA ANALYTICS WAREHOUSE

CLAIM OF PRIORITY

This application claims the benefit of priority to U.S. Provisional Patent Application titled "REMOTE DATA GATEWAY FOR USE WITH A DATA ANALYTICS WAREHOUSE", Application No. 63/083,318, filed Sep. 25, 2020; which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments described herein are generally related to computer data analytics, and computer-based methods of providing business intelligence or other types of data, and are particularly related to systems and methods for providing a remote data gateway for use with a data analytics warehouse.

BACKGROUND

Generally described, within an organization, data analytics enables the computer-based examination or analysis of large amounts of data, in order to derive conclusions or other information from that data; while business intelligence tools provide an organization's business users with information describing their enterprise data in a format that enables those business users to make strategic business decisions.

Increasingly, there is an interest in developing software applications that leverage the use of data analytics within the context of an organization's enterprise software application or data environment, such as, for example, an Oracle Fusion Applications environment or other type of enterprise software application or data environment; or within the context of a software-as-a-service (SaaS) or cloud environment, such as, for example, an Oracle Analytics Cloud or Oracle Cloud Infrastructure environment, or other type of cloud environment.

However, data analytics customers may operate their own data centers, including storing their data in on-premise databases, and may not wish to open firewall network ports to allow communication of their data over a public network, such as the Internet, for use with a cloud-based data analytics environment.

SUMMARY

In accordance with an embodiment, described herein are systems and methods for providing a remote data gateway for use with an analytics environment, such as, for example, an Oracle Analytics Cloud environment, or a data warehouse or other type of analytics or computing environment.

In accordance with an embodiment, the remote data gateway enables secure access by a data analytics warehouse operating in a cloud environment, to a customer's on-premise data, without migrating their on-premise data to the cloud. An on-premise data client exposes a port, which a data analytics remote data gateway server connects to, authenticates itself, and thereafter calls into the client periodically, via a remote data gateway agent, to check for subsequent requests, for example to provide on-premise data to the cloud environment, or to run data analytics on the on-premise data.

DETAILED DESCRIPTION

Figure 1:
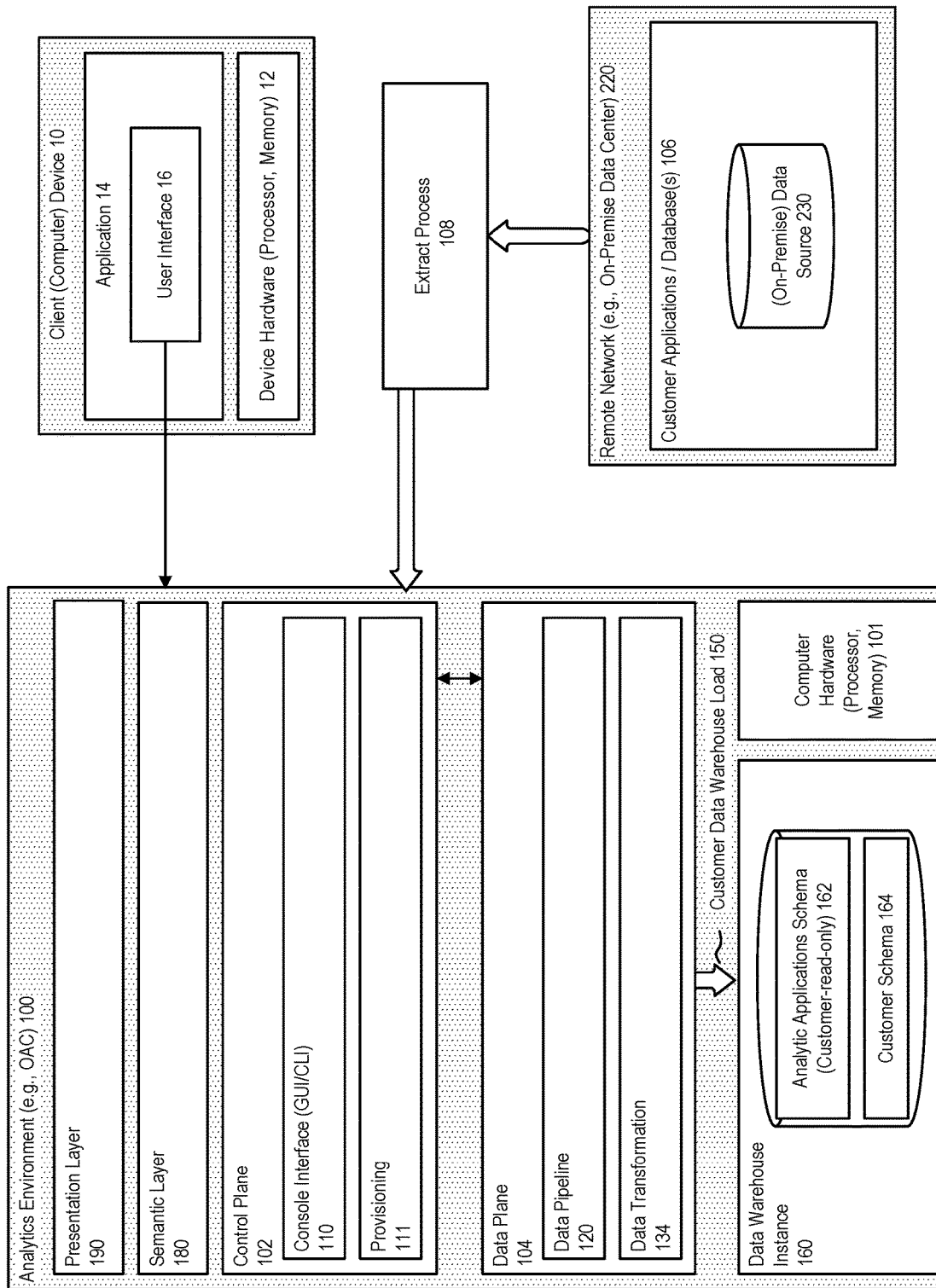
FIG. 1 illustrates an example of an analytics environment, in accordance with an embodiment.

As described above, within an organization, data analytics enables the computer-based examination or analysis of large amounts of data, in order to derive conclusions or other information from that data; while business intelligence tools provide an organization's business users with information describing their enterprise data in a format that enables those business users to make strategic business decisions.

Increasingly, there is an interest in developing software applications that leverage the use of data analytics within the context of an organization's enterprise software application or data environment, such as, for example, an Oracle Fusion Applications environment or other type of enterprise software application or data environment; or within the context of a software-as-a-service (SaaS) or cloud environment, such as, for example, an Oracle Analytics Cloud or Oracle Cloud Infrastructure environment, or other type of cloud environment.

However, data analytics customers may operate their own data centers, including storing their data in on-premise databases, and may not wish to open firewall network ports to allow communication of their data over a public network, such as the Internet, for use with a cloud-based data analytics environment.

In accordance with an embodiment, described herein are systems and methods for providing a remote data gateway (RDG) for use with an analytics environment, such as, for example, an Oracle Analytics Cloud (OAC) environment, or a data warehouse or other type of analytics or computing environment.

In accordance with an embodiment, the remote data gateway enables secure access by a data analytics warehouse operating in a cloud environment, to a customer's on-premise data, without migrating their on-premise data to the cloud. An on-premise data client exposes a port, which a data analytics remote data gateway server connects to, authenticates itself, and thereafter calls into the client periodically, via a remote data gateway agent, to check for subsequent requests, for example to provide on-premise data to the cloud environment, or to run data analytics on the on-premise data.

In accordance with an embodiment, if a remote data gateway server cannot reach a particular data client at its remote data gateway agent, then it can determine which other clients it can get requests from. To address this, the system can use a process of inverse proxy peer-to-peer routing—if a client has a request to be processed, but the server has not yet called into that client, then the client can hand off the request to a peer remote data gateway server, and the server can retrieve/process that request from that server operating as a proxy.

Analytics Environments

In accordance with an embodiment, an analytics environment, or data warehouse environment or component, such as, for example, an Oracle Autonomous Data Warehouse (ADW), Oracle Autonomous Data Warehouse Cloud (ADWC), or other type of data warehouse environment or component adapted to store large amounts of data, can provide a central repository for storage of data collected by one or more business applications.

For example, in accordance with an embodiment, the data warehouse environment or component can be provided as a multi-dimensional database that employs online analytical processing (OLAP) or other techniques to generate business-related data from multiple different sources of data. An organization can extract such business-related data from one or more vertical and/or horizontal business applications, and inject the extracted data into a data warehouse instance that is associated with that organization, Such environments allow customers (tenants) to develop computer-executable software analytic applications for use with a BI component, such as, for example, an Oracle Business Intelligence Applications (OBIA) environment, or other type of BI component adapted to examine large amounts of data sourced either by the customer (tenant) itself, or from multiple third-party entities. As another example, an analytics environment can be used to pre-populate a reporting interface of a data warehouse instance with relevant metadata describing business-related data objects in the context of various business productivity software applications, for example, to include predefined dashboards, key performance indicators (KPIs), or other types of reports.

FIG. 1 illustrates an example of an analytics environment, in accordance with an embodiment.

The example shown and described in FIG. 1 is provided for purposes of illustrating an example of one type of data analytics environment that can utilize the various embodiments of remote data gateway as described herein. In accordance with other embodiments and examples, the remote data gateway features that are described herein can be used with other types of data analytics environments.

As illustrated in FIG. 1, in accordance with an embodiment, an analytic applications environment or analytics environment 100 can be provided by, or otherwise operate at, a computer system having a computer hardware (e.g., processor, memory) 101, and including one or more software components operating as a control plane 102, and a data plane 104, and providing access to a data warehouse, or data warehouse instance 160.

In accordance with an embodiment, the components and processes illustrated in FIG. 1, and as further described herein with regard to various other embodiments, can be provided as software or program code executable by a computer system or other type of processing device. For example, in accordance with an embodiment, the components and processes described herein can be provided by a cloud computing system, or other suitably-programmed computer system.

In accordance with an embodiment, the control plane operates to provide control for cloud or other software products offered within the context of a SaaS or cloud environment, such as, for example, an Oracle Analytics Cloud or Oracle Cloud Infrastructure environment, or other type of cloud environment. For example, in accordance with an embodiment, the control plane can include a console interface 110 that enables access by a client computer device 10 having a device hardware 12, application 14, and user interface 16, under control of a customer (tenant) and/or a cloud environment having a provisioning component 111.

In accordance with an embodiment, the console interface can enable access by a customer (tenant) operating a graphical user interface (GUI) and/or a command-line interface (CLI) or other interface; and/or can include interfaces for use by providers of the SaaS or cloud environment and its customers (tenants). For example, in accordance with an embodiment, the console interface can provide interfaces that allow customers to provision services for use within their SaaS environment, and to configure those services that have been provisioned.

In accordance with an embodiment, a customer (tenant) can request the provisioning of a customer schema 164 within the data warehouse. The customer can also supply, via the console interface, a number of attributes associated with the data warehouse instance, including required attributes (e.g., login credentials), and optional attributes (e.g., size, or speed). The provisioning component can then provision the requested data warehouse instance, including a customer schema of the data warehouse; and populate the data warehouse instance with the appropriate information supplied by the customer.

In accordance with an embodiment, the provisioning component can also be used to update or edit a data warehouse instance, and/or an ETL process that operates at the data plane, for example, by altering or updating a requested frequency of ETL process runs, for a particular customer (tenant).

In accordance with an embodiment, the data plane API can communicate with the data plane. For example, in accordance with an embodiment, provisioning and configuration changes directed to services provided by the data plane can be communicated to the data plane via the data plane API.

In accordance with an embodiment, the data plane can include a data pipeline or process layer 120 and a data transformation layer 134, that together process operational or transactional data from an organization's enterprise software application or data environment, such as, for example, business productivity software applications provisioned in a customer's (tenant's) SaaS environment. The data pipeline or process can include various functionality that extracts transactional data from business applications and databases that are provisioned in the SaaS environment, and then load a transformed data into the data warehouse.

In accordance with an embodiment, the data transformation layer can include a data model, such as, for example, a knowledge model (KM), or other type of data model, that the system uses to transform the transactional data received from business applications and corresponding transactional databases provisioned in the SaaS environment, into a model format understood by the analytics environment. The model format can be provided in any data format suited for storage in a data warehouse. In accordance with an embodiment, the data plane can also include a data and configuration user interface 130, and mapping and configuration database 132.

In accordance with an embodiment, the data warehouse can include a default analytic applications schema (referred to herein in accordance with some embodiments as an analytic warehouse schema) 162 and, for each customer (tenant) of the system, a customer schema as described above.

In accordance with an embodiment, the data plane is responsible for performing extract, transform, and load (ETL) operations, including extracting transactional data from an organization's enterprise software application or data environment, such as, for example, business productivity software applications and corresponding transactional databases offered in a SaaS environment, transforming the extracted data into a model format, and loading the transformed data into a customer schema of the data warehouse.

For example, in accordance with an embodiment, each customer (tenant) of the environment can be associated with their own customer tenancy within the data warehouse, that is associated with their own customer schema; and can be additionally provided with read-only access to the analytic applications schema, which can be updated by a data pipeline or process, for example, an ETL process, on a periodic or other basis.

In accordance with an embodiment, a data pipeline or process can be scheduled to execute at intervals (e.g., hourly/daily/weekly) to extract transactional data from an enterprise software application or data environment, such as, for example, business productivity software applications and corresponding transactional databases 106 that are provisioned in the SaaS environment.

In accordance with an embodiment, an extract process 108 can extract the transactional data, whereupon extraction the data pipeline or process can insert extracted data into a data staging area, which can act as a temporary staging area for the extracted data. The data quality component and data protection component can be used to ensure the integrity of the extracted data. For example, in accordance with an embodiment, the data quality component can perform validations on the extracted data while the data is temporarily held in the data staging area.

In accordance with an embodiment, when the extract process has completed its extraction, the data transformation layer can be used to begin the transform process, to transform the extracted data into a model format to be loaded into the customer schema of the data warehouse.

As described above, in accordance with an embodiment, the data pipeline or process can operate in combination with the data transformation layer to transform data into the model format. The mapping and configuration database can store metadata and data mappings that define the data model used by data transformation. The data and configuration user interface (UI) can facilitate access and changes to the mapping and configuration database.

In accordance with an embodiment, the data transformation layer can transform extracted data into a format suitable for loading into a customer schema of data warehouse, for example according to the data model as described above. During the transformation, the data transformation can perform dimension generation, fact generation, and aggregate generation, as appropriate. Dimension generation can include generating dimensions or fields for loading into the data warehouse instance.

In accordance with an embodiment, after transformation of the extracted data, the data pipeline or process can execute a warehouse load procedure 150, to load the transformed data into the customer schema of the data warehouse instance. Subsequent to the loading of the transformed data into customer schema, the transformed data can be analyzed and used in a variety of additional business intelligence processes.

Different customers of a data analytics environment may have different requirements with regard to how their data is classified, aggregated, or transformed, for purposes of providing data analytics or business intelligence data, or developing software analytic applications.

In accordance with an embodiment, to support such different requirements, a semantic layer 180 can include data defining a semantic model of a customer's data; which is useful in assisting users in understanding and accessing that data using commonly-understood business terms; and provide custom content to a presentation layer 190.

In accordance with an embodiment, the presentation layer can enable access to the data content using, for example, a software analytic application, user interface, dashboard, key performance indicators (KPI's); or other type of report or interface as may be provided by products such as, for example, Oracle Analytics Cloud, or Oracle Analytics for Applications.

Remote Data Gateway

In accordance with an embodiment, the system can include a remote data gateway (RDG) for use with a data analytics warehouse or other types of analytic application environment, or analytics cloud computing environment, such as, for example, an Oracle Analytics Cloud (OAC) environment. The analytics cloud environment can communicate through a firewall with an on-premise environment that channels database queries between the analytics cloud environment and an on-premise database; including that the analytics cloud environment issues and queues queries; the remote data gateway agent looks for queries to process; executes the queries; and sends the query results to the analytics cloud environment.

In accordance with an embodiment, the remote data gateway enables secure access by a data analytics warehouse operating in a cloud environment, to a customer's on-premise data, without migrating their on-premise data to the cloud. An on-premise data client exposes a port, which a data analytics remote data gateway server connects to, authenticates itself, and thereafter calls into the client periodically, via a remote data gateway agent, to check for subsequent requests, for example to provide on-premise data to the cloud environment, or to run data analytics on the on-premise data.

The remote data gateway enables an analytics cloud environment to access and use large on-premise data sets, without migrating the data to the cloud. Users can then analyze the data, for example by using a business intelligence (BI) server or data visualization (DV) component in generating data visualizations, or in reporting dashboards and analyses.

Figure 2:
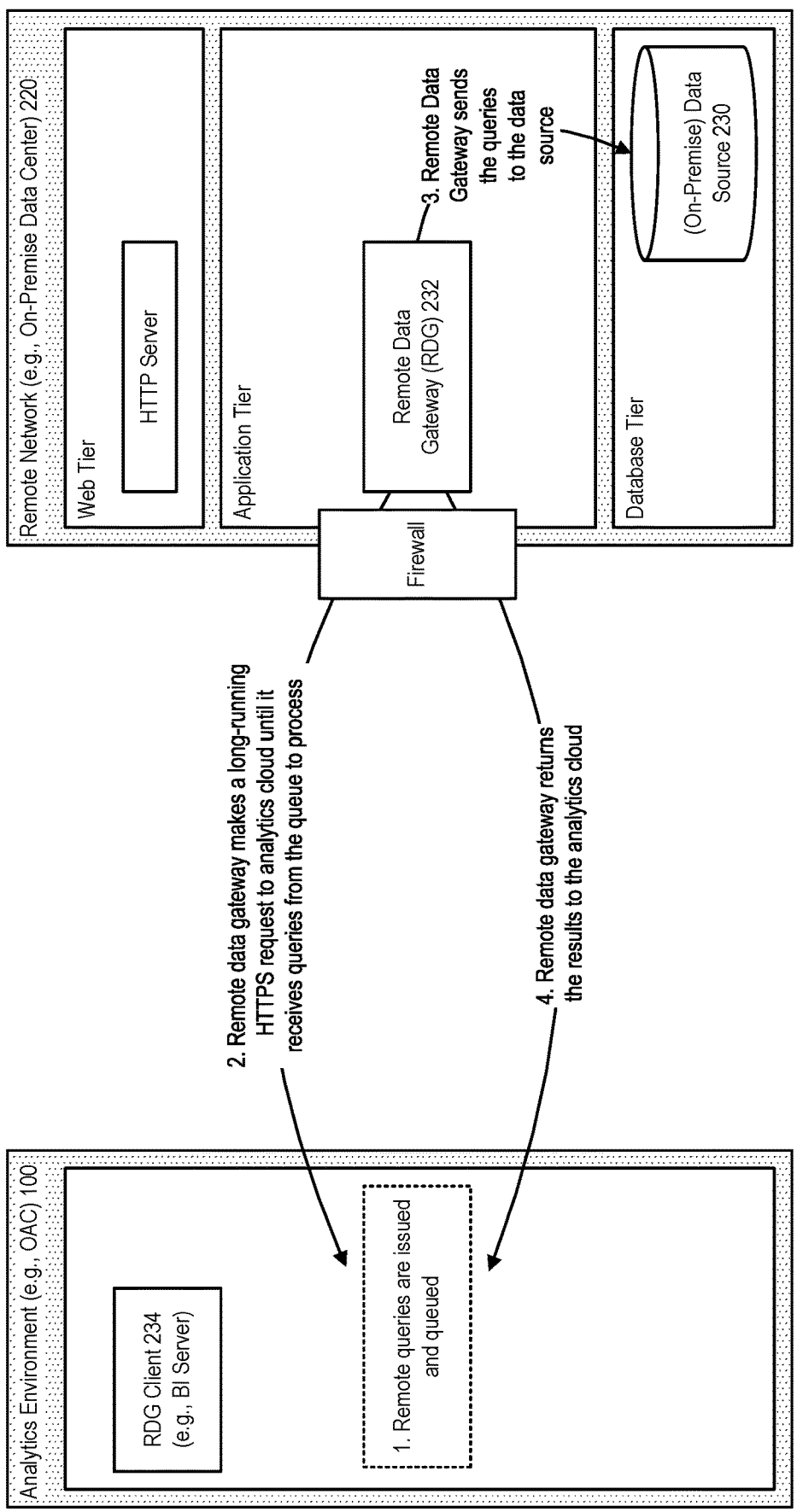
FIG. 2 illustrates the use of a remote data gateway with an analytics environment, in accordance with an embodiment.

FIG. 2 illustrates the use of a remote data gateway with an analytics environment, in accordance with an embodiment.

As illustrated in FIG. 2, in accordance with an embodiment, in a deployment at a remote network 220 (e.g., a customer on-premise data center) that includes a data source 230, a remote data gateway 232 is installed in the remote network and configured as an agent for communication with a remote data gateway client 234, for example an analytics cloud instance, such as a business intelligence (BI) server (e.g., Oracle BI Server, Oracle BI Publisher), or other entity that requires access to the data.

In accordance with an embodiment, the analytics cloud environment can communicate through a firewall with the on-premise database using HTTPS, while the remote data gateway agent installed in the on-premise environment channels database queries between the analytics cloud environment and the on-premise database.

For example, as further illustrated in FIG. 2, the analytics cloud environment issues and queues queries; the remote data gateway operating as an agent looks for queries to process; executes the queries; and sends the query results to the analytics cloud environment.

In accordance with an embodiment, the remote data gateway polls the analytics cloud environment for queries to run against the on-premise data sources, and the results of these queries are returned to the analytics cloud environment.

In accordance with an embodiment, remote data gateway traffic can be signed with an encryption key, and each packet additionally encrypted by Transport Layer Security/Secure Sockets Layer. Data flows can source data from remote connections; however, data flows generally cannot save data to data sets that use remote connections.

Figure 3:
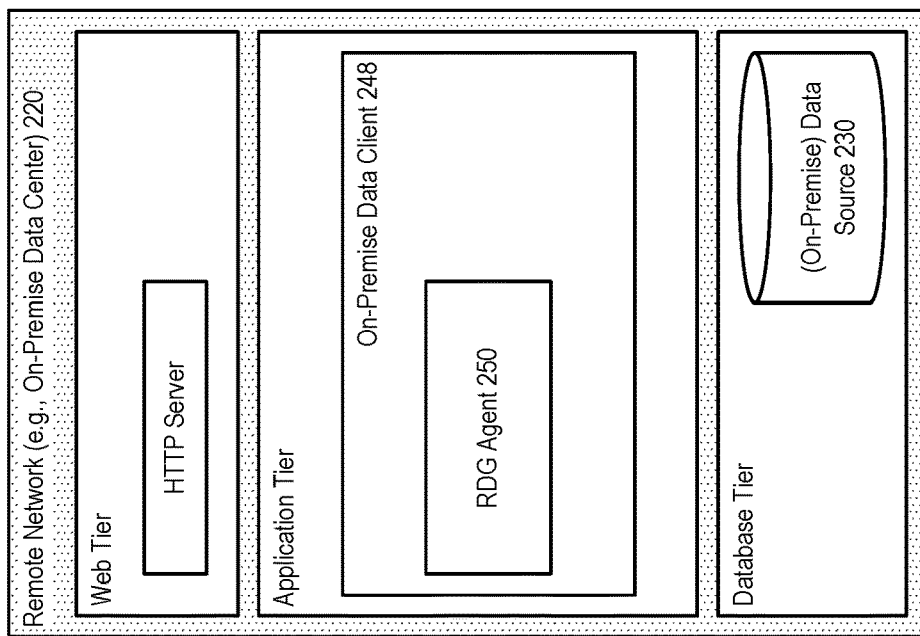
FIG. 3 further illustrates the use of a remote data gateway with an analytics environment, in accordance with an embodiment.
Figure 3:
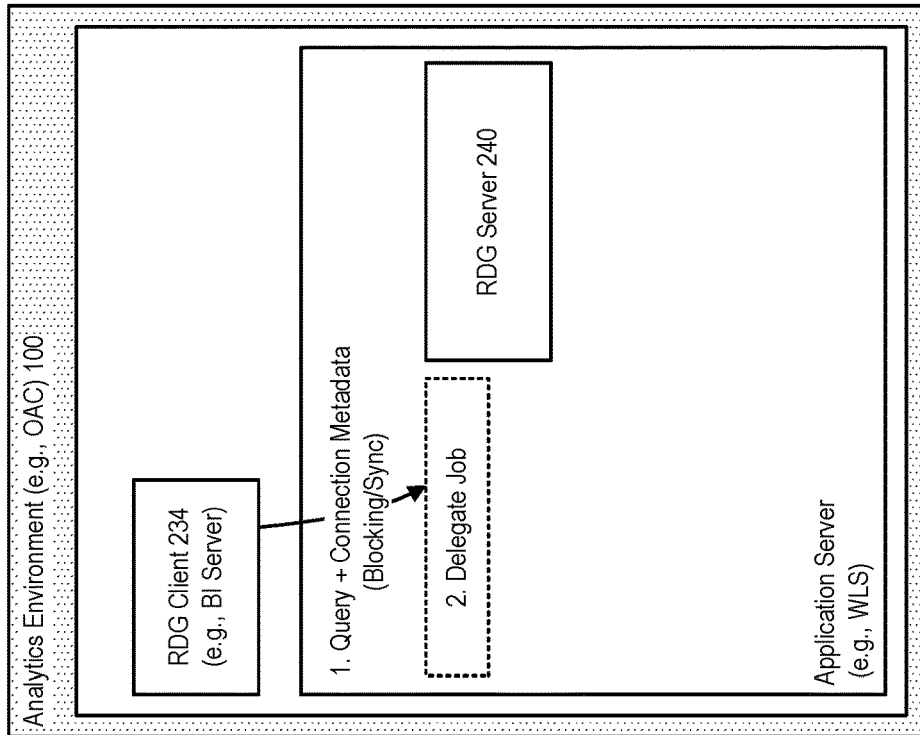

FIG. 3 further illustrates the use of a remote data gateway with an analytics environment, in accordance with an embodiment.

As illustrated in FIG. 3, in accordance with an embodiment, a remote data gateway server (RDG server) 240 can communicate with a remote data gateway agent (RDG agent) 250 deployed behind a customer firewall on the network of their data store. An on-premise data client 248 exposes a port, which the remote data gateway server connects to, authenticates itself, and thereafter calls into the client periodically, via the remote data gateway agent, to check for subsequent requests, for example to provide on-premise data to the cloud environment, or to run data analytics on the on-premise data.

Figure 4:
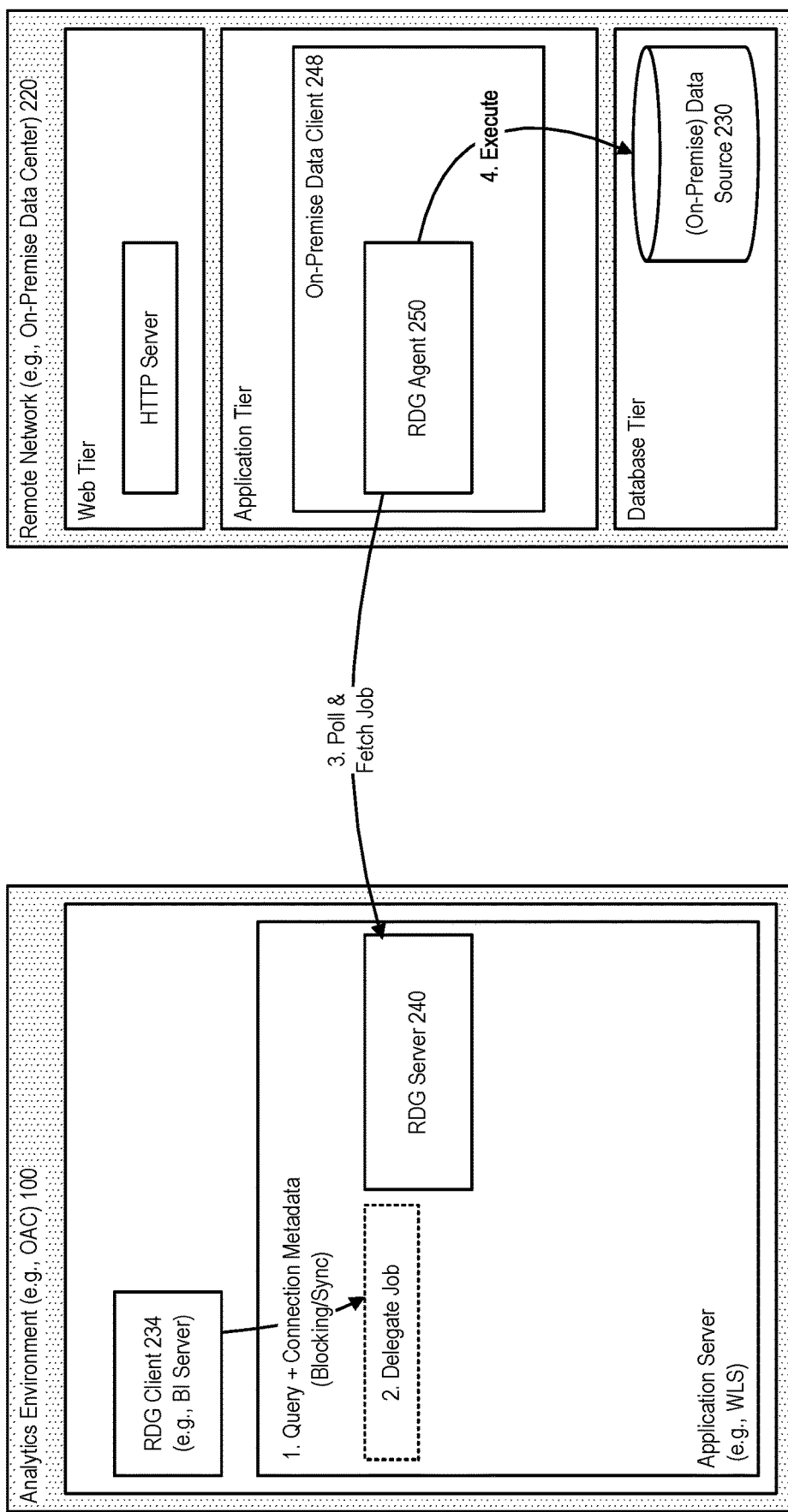
FIG. 4 further illustrates the use of a remote data gateway with an analytics environment, in accordance with an embodiment.

FIG. 4 further illustrates the use of a remote data gateway with an analytics environment, in accordance with an embodiment.

As illustrated in FIG. 4, in accordance with an embodiment, the remote data gateway agent connects to the analytics cloud environment, and asks for pending jobs. At the analytics cloud environment, a remote data gateway server assigns a pending job, from a queue of pending jobs maintained by the server. The remote data gateway agent can connect to the on-premise database, and execute, for example, a SQL query provided by the job (asynchronously).

Figure 5:
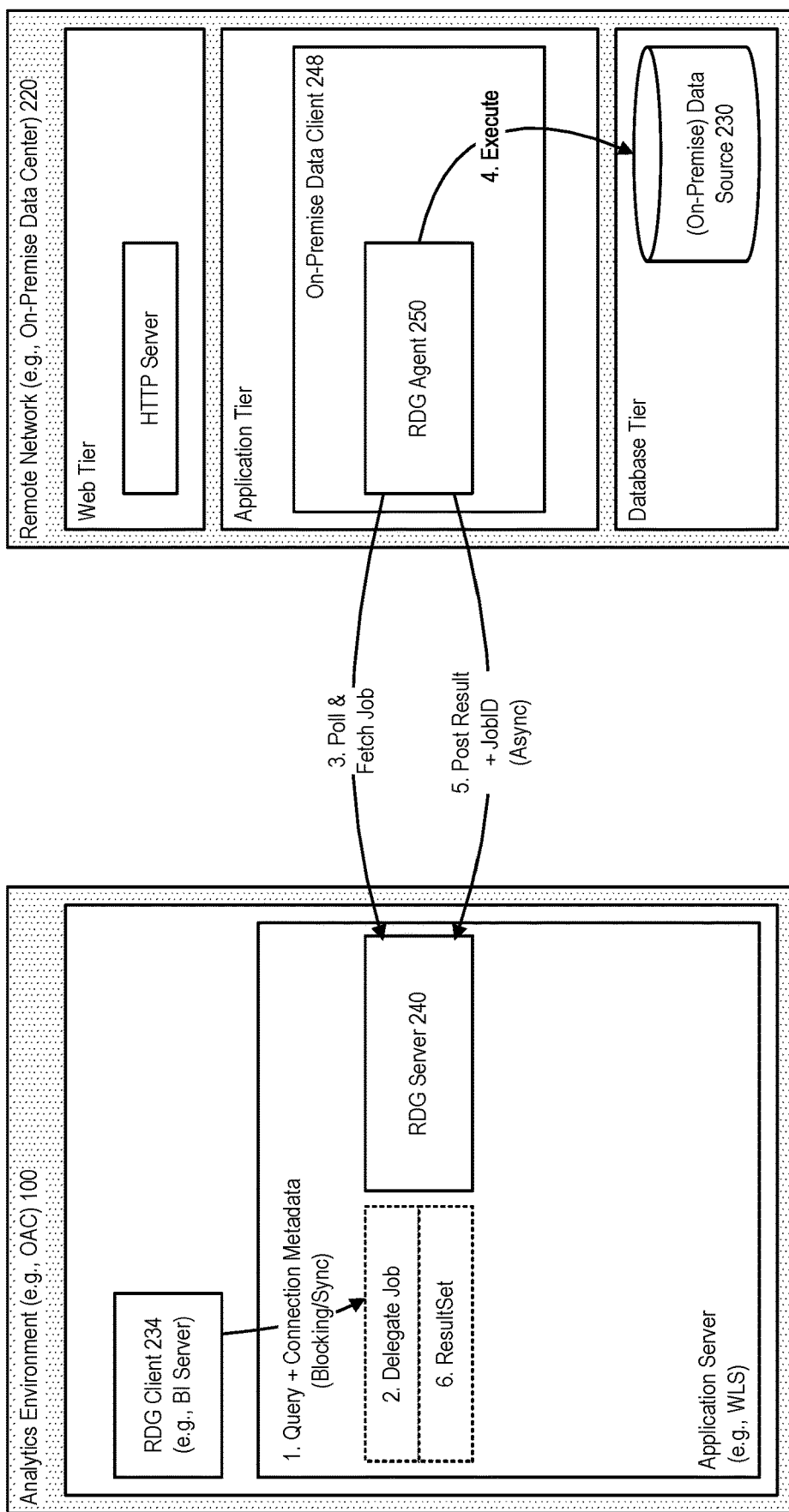
FIG. 5 further illustrates the use of a remote data gateway with an analytics environment, in accordance with an embodiment.

FIG. 5 further illustrates the use of a remote data gateway with an analytics environment, in accordance with an embodiment.

As illustrated in FIG. 5, in accordance with an embodiment, the remote data gateway agent then posts the result set for the job to the analytics cloud environment (remote data gateway server). The analytics cloud environment consumes the query results, and renders visualizations, reports, or dashboards as appropriate.

In accordance with an embodiment, the remote data gateway environment comprises the remote data gateway server and the remote data gateway agent. Both components can be provided, for example, as J2EE web applications (WebApps) designed to be deployed on an application server environment, such as for example, a WebLogic (WLS) or other type of application server.

In accordance with an embodiment, the remote data gateway server acts as a proxy and a buffer for the queries from a remote data gateway client, e.g., a business intelligence (BI) server, such as for example an Oracle BI Server, which operates to hide the asynchronous and stateful communication (e.g., RDCv2) protocol, from the synchronous and stateless BI server.

In accordance with an embodiment, the remote data gateway client or BI server propagates additional connection metadata, for example, to a Java data structure (DS) environment or RDataHandler. The RDataHandler wraps the query in an RDataJob wrapper class that is inserted into the RDataQueue, which serves as the source of jobs for remote data gateway agents. The remote data gateway server maintains the state of the jobs, and persists the history of completed or failed jobs in the, e.g., BI server platform database, for archival and analytics.

In accordance with an embodiment, the remote data gateway agent can be provided as a version of an obi-datasrc-server web application that include Java DS Server and JDBC Cartridge connectivity, packaged as a obi-remotedataconnector.war file. The remote data gateway agent can include a pool of threads for polling the remote data gateway server, and another pool of threads for executing jobs. This allows the poller thread pool to be free to check for pending jobs on the remote data gateway server in parallel, while the executor thread pool can continue executing existing assigned jobs and posting their results back to the remote data gateway server.

Figure 6:
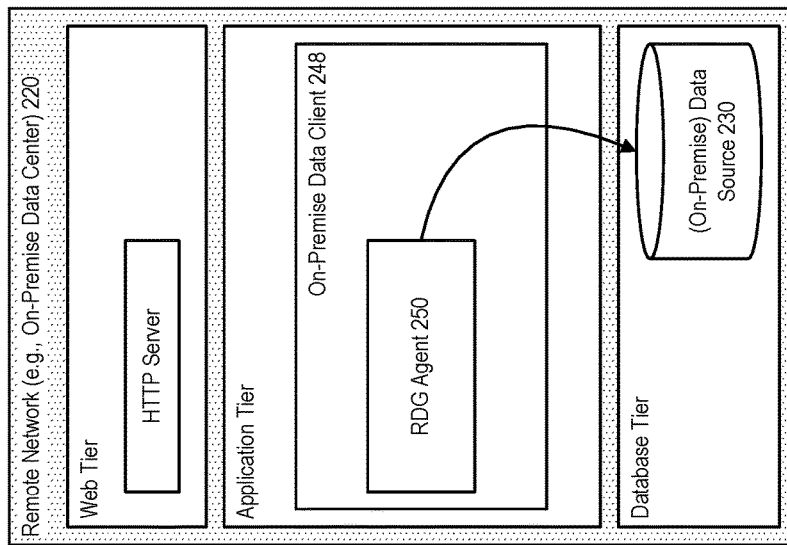
FIG. 6 further illustrates the use of a remote data gateway with an analytics environment, in accordance with an embodiment.
Figure 6:
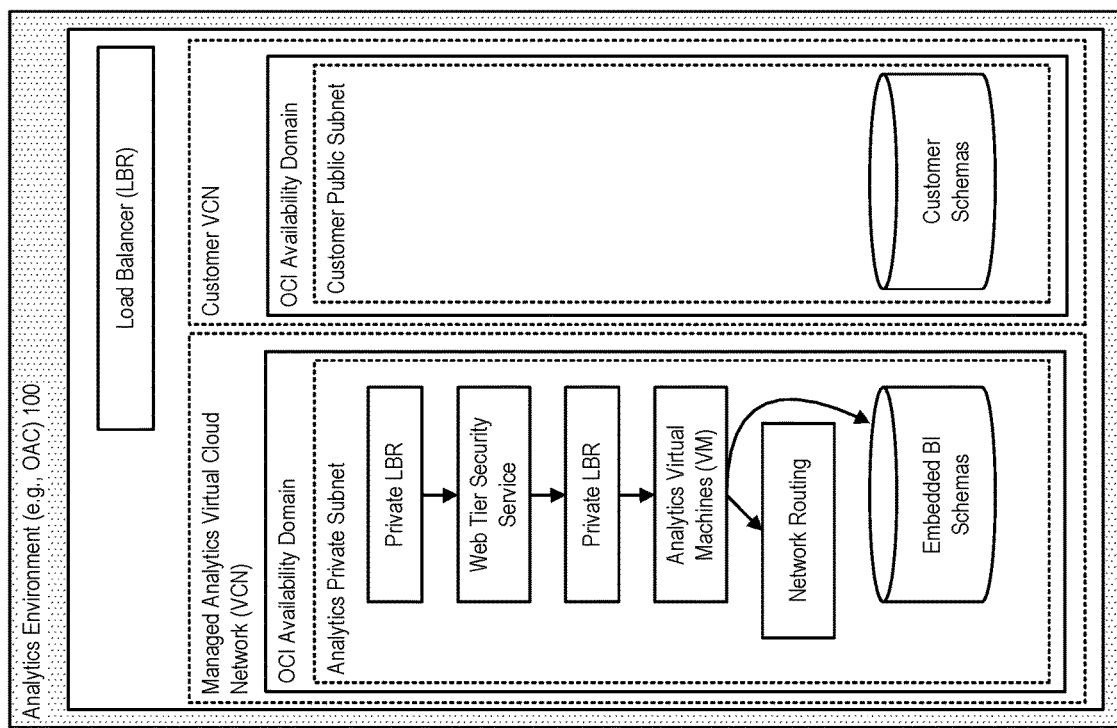

FIG. 6 further illustrates the use of a remote data gateway with an analytics environment, in accordance with an embodiment.

As illustrated in FIG. 6, in accordance with an embodiment, an analytics environment provided, for example, as Oracle Analytics Cloud (OAC), can be provided as a combination of individual BI servers and managed server instances that execute on virtual machines (VMs), wherein a load balancer directs inbound requests to the virtual machines in a round-robin fashion. For a remote data gateway agent, this implies two requirements:

A means of connecting to all virtual machines in the, e.g., OAC, deployment to pick up jobs from all of them; and A means of posting results back to the same virtual machine that the job was picked up from (since communication of BI server with a remote data gateway server is synchronous, the BI server is waiting for the result to be provided by the same remote data gateway server).

In accordance with an embodiment, to address this, the system can employ load balancer stickiness or session persistence, for example using cookies. Fetching jobs can be performed without cookies in the HTTP requests, so the load balancer freely directs the fetch request to any managed server. Sufficiently frequent (e.g., two requests per second) fetch requests from the remote data gateway agent ensure that all managed servers are polled for jobs.

Figure 7:
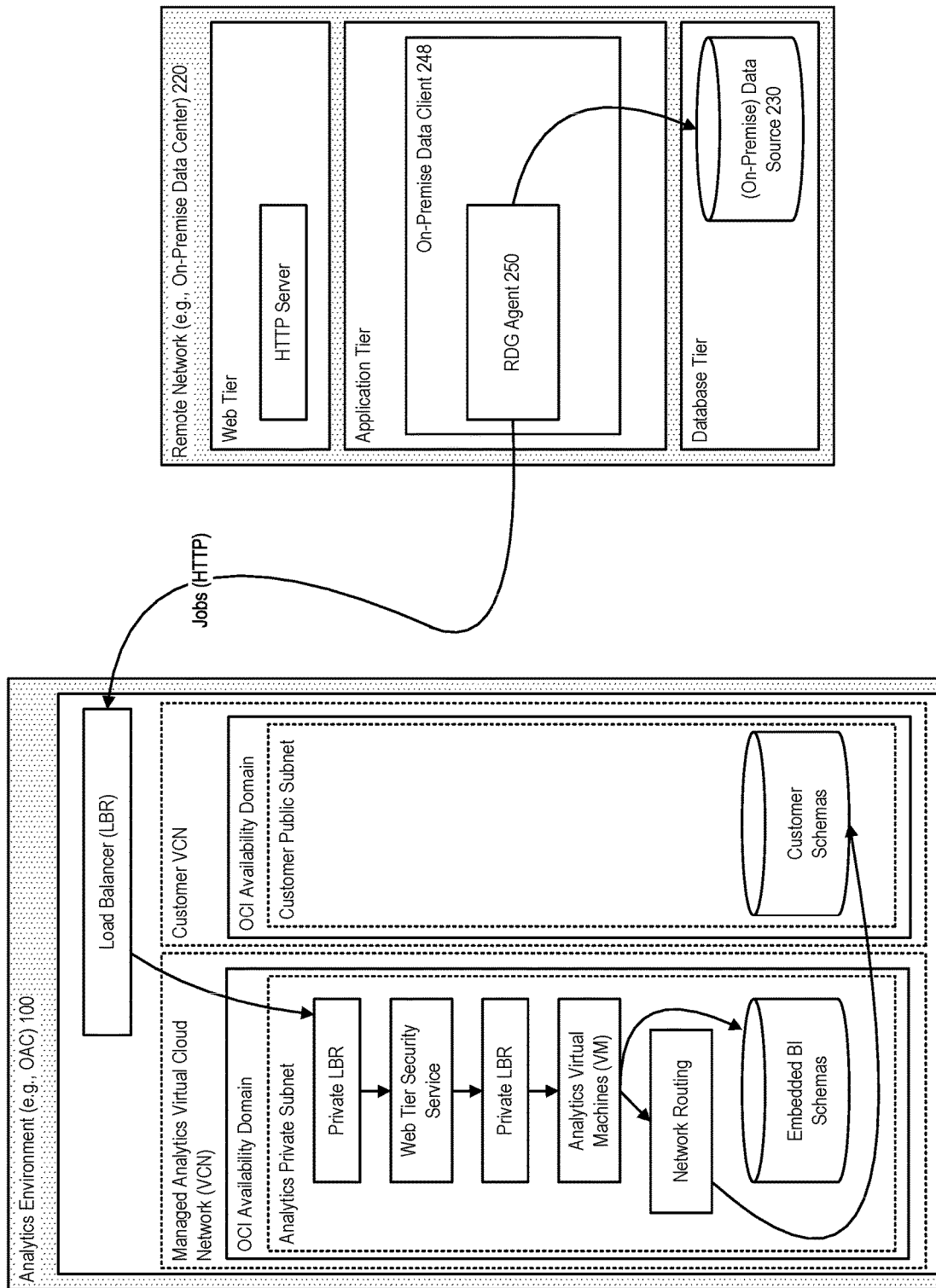
FIG. 7 further illustrates the use of a remote data gateway with an analytics environment, in accordance with an embodiment.

FIG. 7 further illustrates the use of a remote data gateway with an analytics environment, in accordance with an embodiment.

As illustrated FIG. 7, in accordance with an embodiment, using for example HTTP 1.0 (job polling): a client remote data gateway agent initiates a GET request on a job queue HTTP end point after authentication. The job queue is populated on the remote data gateway server side with query payloads generated, for example, from interactive analysis. The client uses the job object to execute the query payload remotely. Once the job is complete, the client initiates a POST to the same endpoint with origin server cookie to ensure posting with origin server affinity.

In accordance with an embodiment, using for example web-sockets: the client and server establish a long running full duplex communication. The client keeps listening for server requests. The remote data gateway server pushes the job objects to the client and client will complete processing and post results to the server.

Figure 8A:
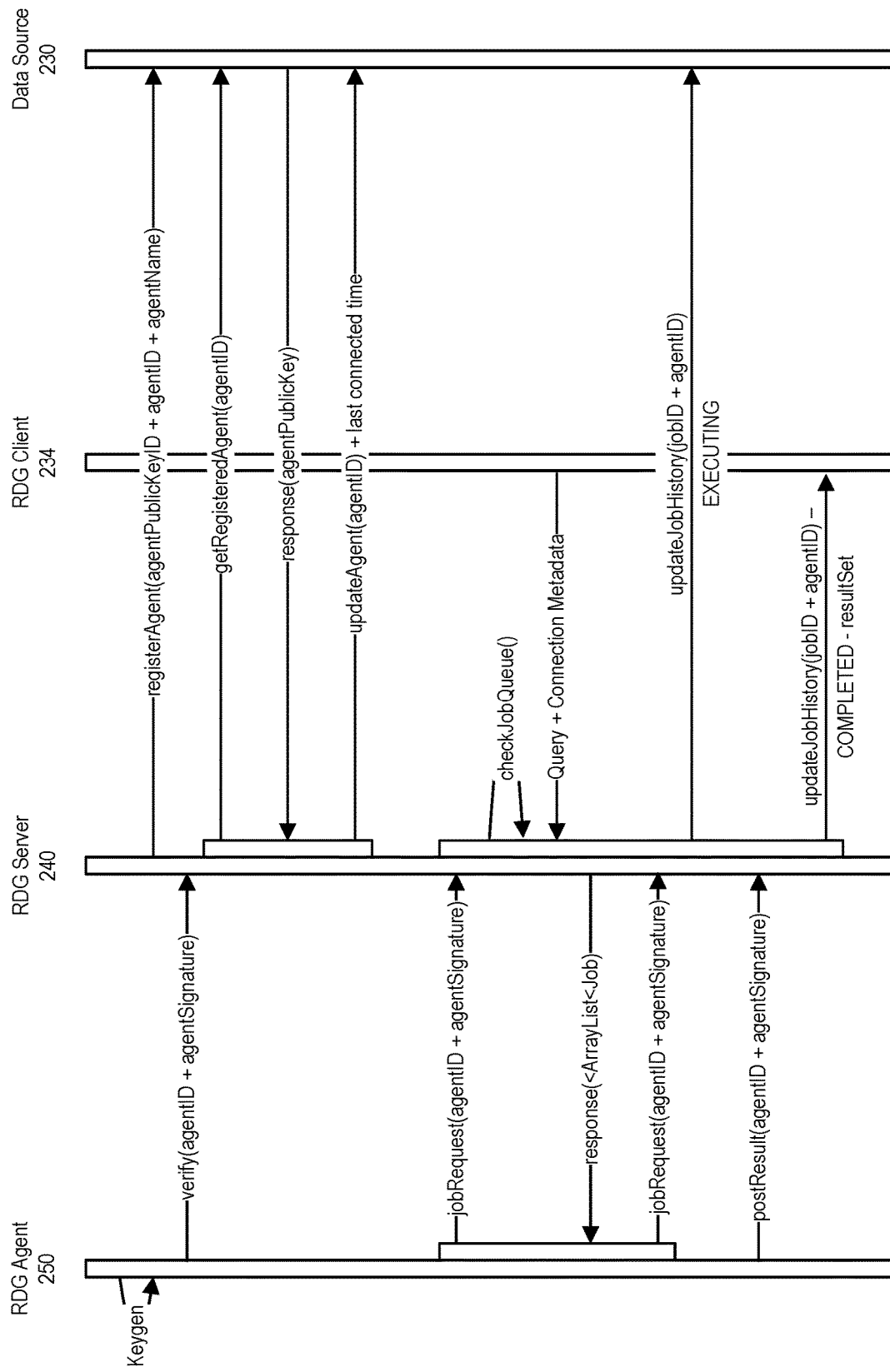
FIG. 8A illustrates an example sequence diagram associated with the use of a remote data gateway with an analytics environment, in accordance with an embodiment.
Figure 8B:
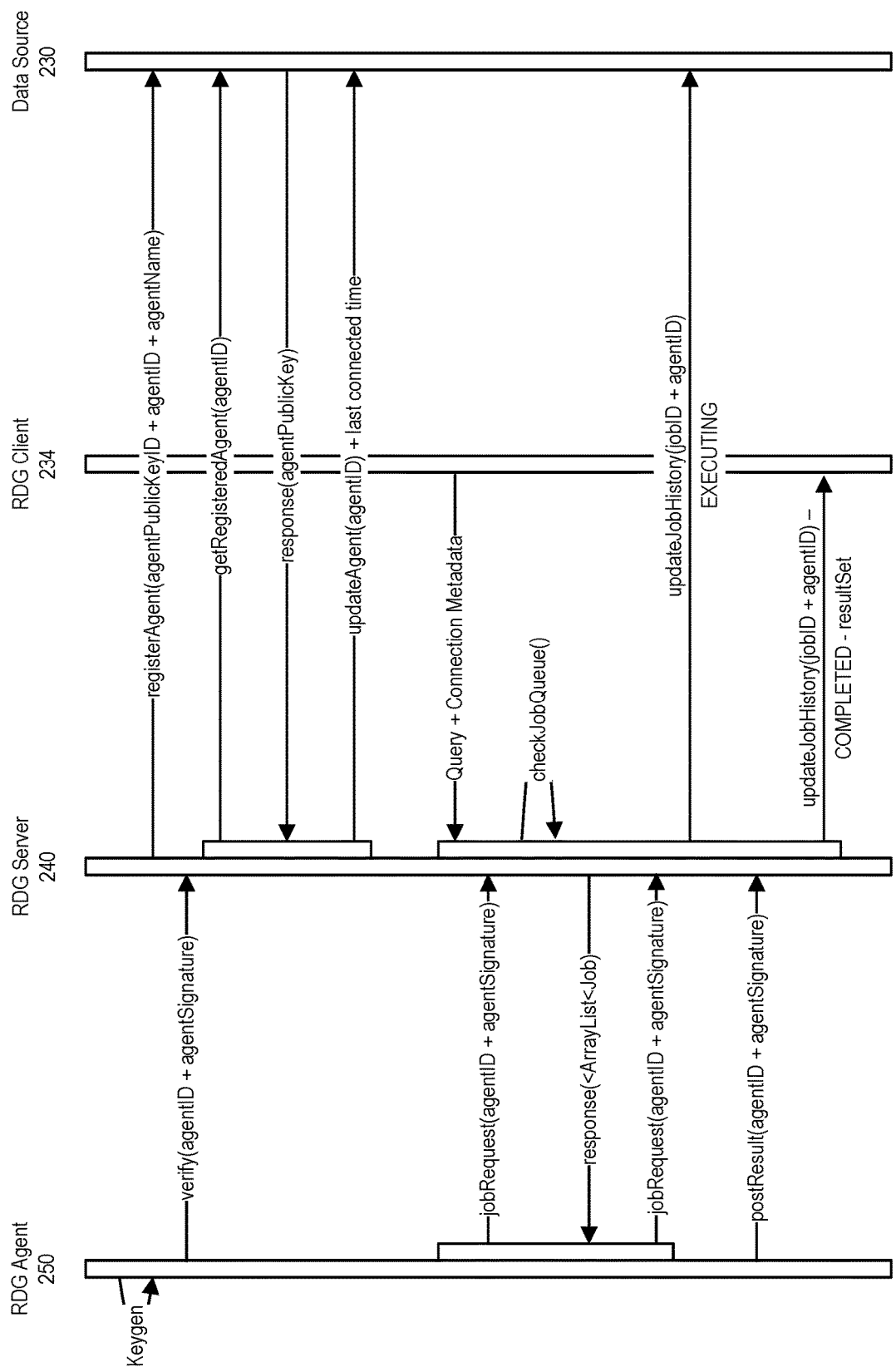
FIG. 8B illustrates an example sequence diagram associated with the use of a remote data gateway with an analytics environment, in accordance with an embodiment.

FIGS. 8A and 8B illustrate an example sequence diagram associated with the use of a remote data gateway with an analytics environment, in accordance with an embodiment.

As illustrated in FIGS. 8A-8B, in accordance with various embodiments, an on-premise data client exposes a port, which a data analytics remote data gateway server connects to, authenticates itself, and thereafter calls into the client periodically, via a remote data gateway agent, to check for subsequent requests, for example to provide on-premise data to the cloud environment, or to run data analytics on the on-premise data.

In accordance with various embodiments, either the remote data gateway agent can call into the client prior to the client issuing a request (FIG. 8A); and/or the client can issue a request prior to the remote data gateway agent checking for the request (FIG. 8B).

Figure 9:
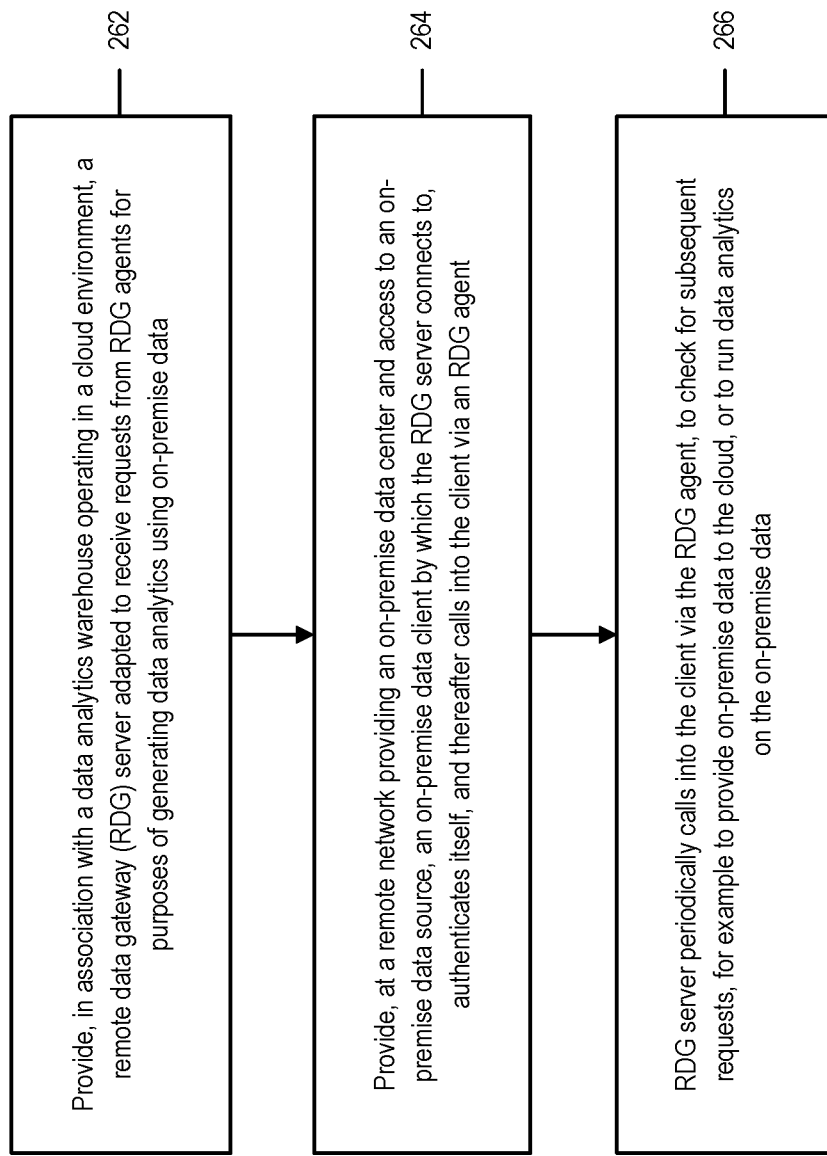
FIG. 9 illustrates a process for use of a remote data gateway with an analytics environment, in accordance with an embodiment.

FIG. 9 illustrates a process for use of a remote data gateway with an analytics environment, in accordance with an embodiment.

As illustrated in FIG. 9, in accordance with an embodiment, at step 262, in association with a data analytics warehouse operating in a cloud environment, a remote data gateway (RDG) server is adapted to receive requests from remote data gateway agents for purposes of generating data analytics using on-premise data.

At step 264, at a remote network providing an on-premise data center and access to an on-premise data source, an on-premise data client is provided by which the remote data gateway server connects to, authenticates itself, and thereafter calls into the client via a remote data gateway agent.

At step 266, the remote data gateway server periodically calls into the client via the Remote data gateway agent, to check for subsequent requests, for example to provide on-premise data to the cloud environment, or to run data analytics on the on-premise data.

RDG Server Peer Routing

In accordance with an embodiment, if a remote data gateway server cannot reach a particular data client at its remote data gateway agent, then it can determine which other clients it can get requests from. To address this, the system can use a process of inverse proxy peer-to-peer routing—if a client has a request to be processed, but the server has not yet called into that client, then the client can hand off the request to a peer remote data gateway server, and the server can retrieve/process that request from that server operating as a proxy.

Figure 10:
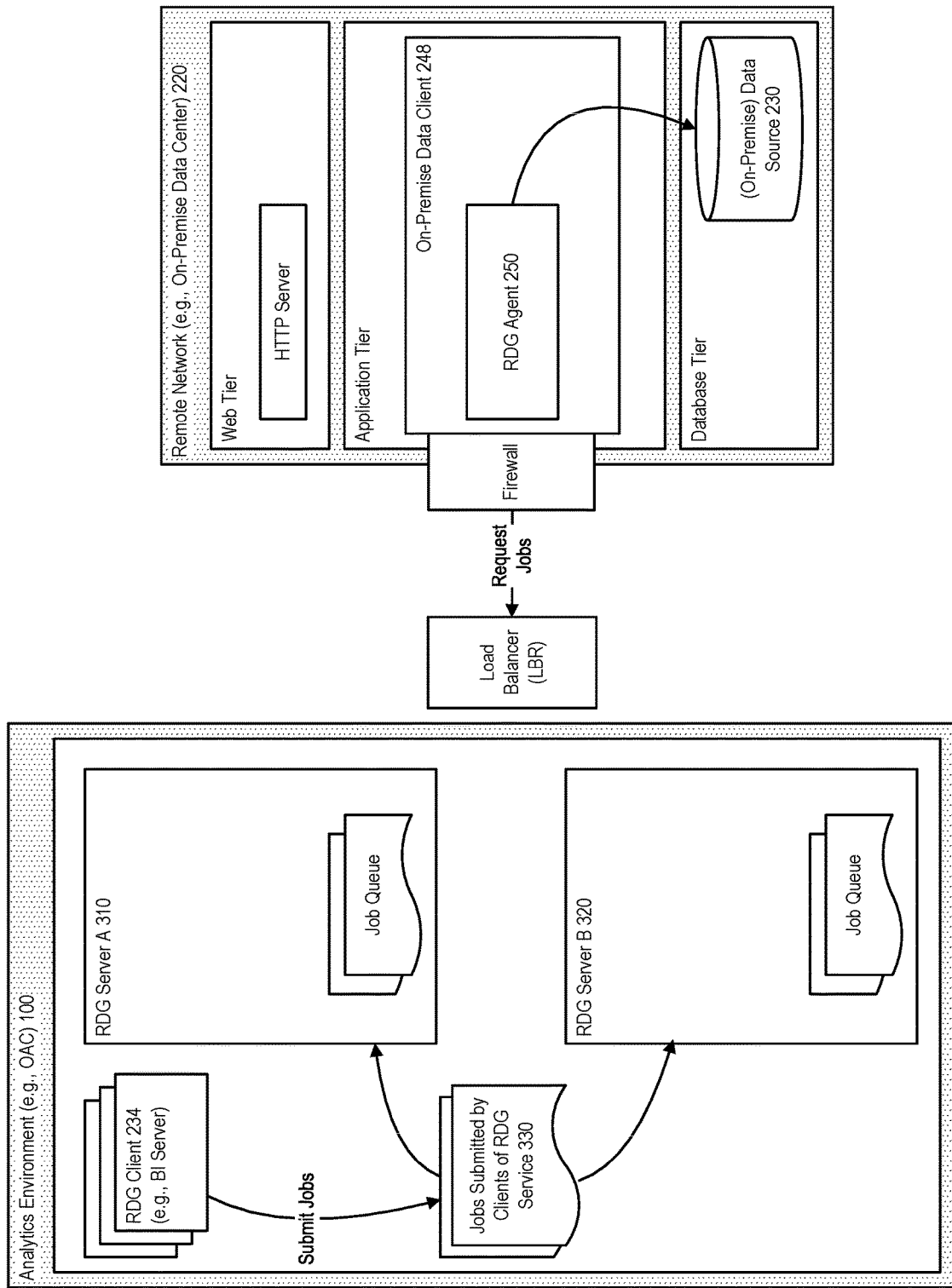
FIG. 10 illustrates the use of a remote data gateway that supports peer routing with an analytics environment, in accordance with an embodiment.

FIG. 10 illustrates the use of a remote data gateway that supports peer routing with an analytics environment, in accordance with an embodiment.

As illustrated in FIG. 10, in accordance with an embodiment, each remote data gateway server (here indicated as RDG Server A 310, and RDG server B 320) holds a job queue for execution of jobs 330 (queries, requests, tasks, etc.) to be delegated to a remote data gateway agent. The remote data gateway agent connects to the remote data gateway server, and picks up these jobs from the queue for execution. The remote data gateway agent then executes these jobs and submits the results through an out-of-band asynchronous connection to the same server.

Figure 11:
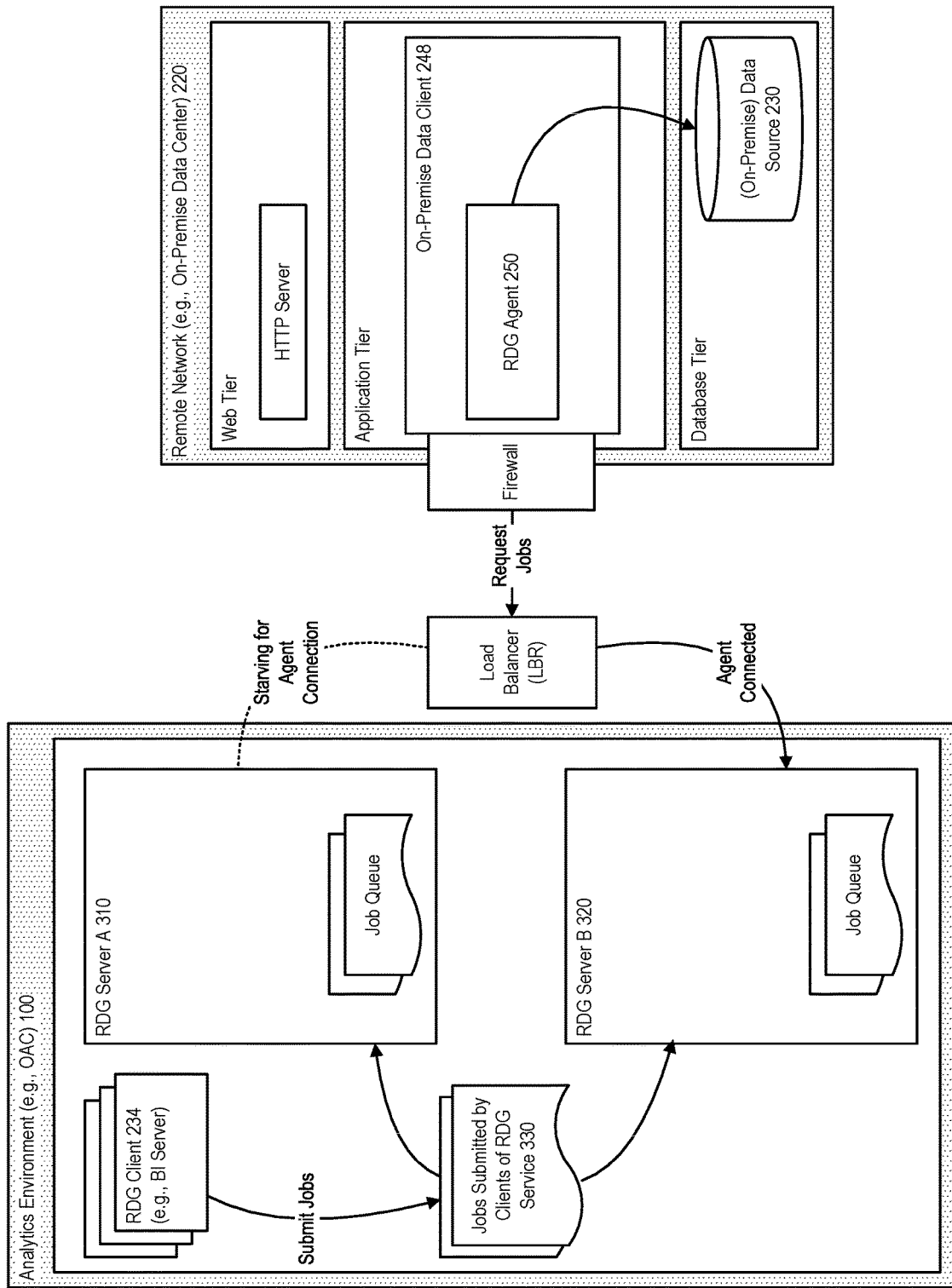
FIG. 11 further illustrates the use of a remote data gateway that supports peer routing with an analytics environment, in accordance with an embodiment.

FIG. 11 further illustrates the use of a remote data gateway that supports peer routing with an analytics environment, in accordance with an embodiment.

As illustrated in FIG. 11, in accordance with an embodiment, in a high availability, scaled out production environment, there are multiple remote data gateway servers deployed to handle the load of jobs, behind a load balancer, and the remote data gateway agent needs to connect to all of them to pick up jobs from each server—since each server maintains its own queue. If a remote data gateway agent is unable to connect to a particular remote data gateway server instance, for example, due to load balancer issues, or insufficient parallel connections form the remote data gateway agent, then the jobs sitting in that server queue are starving for an agent.

Figure 12:
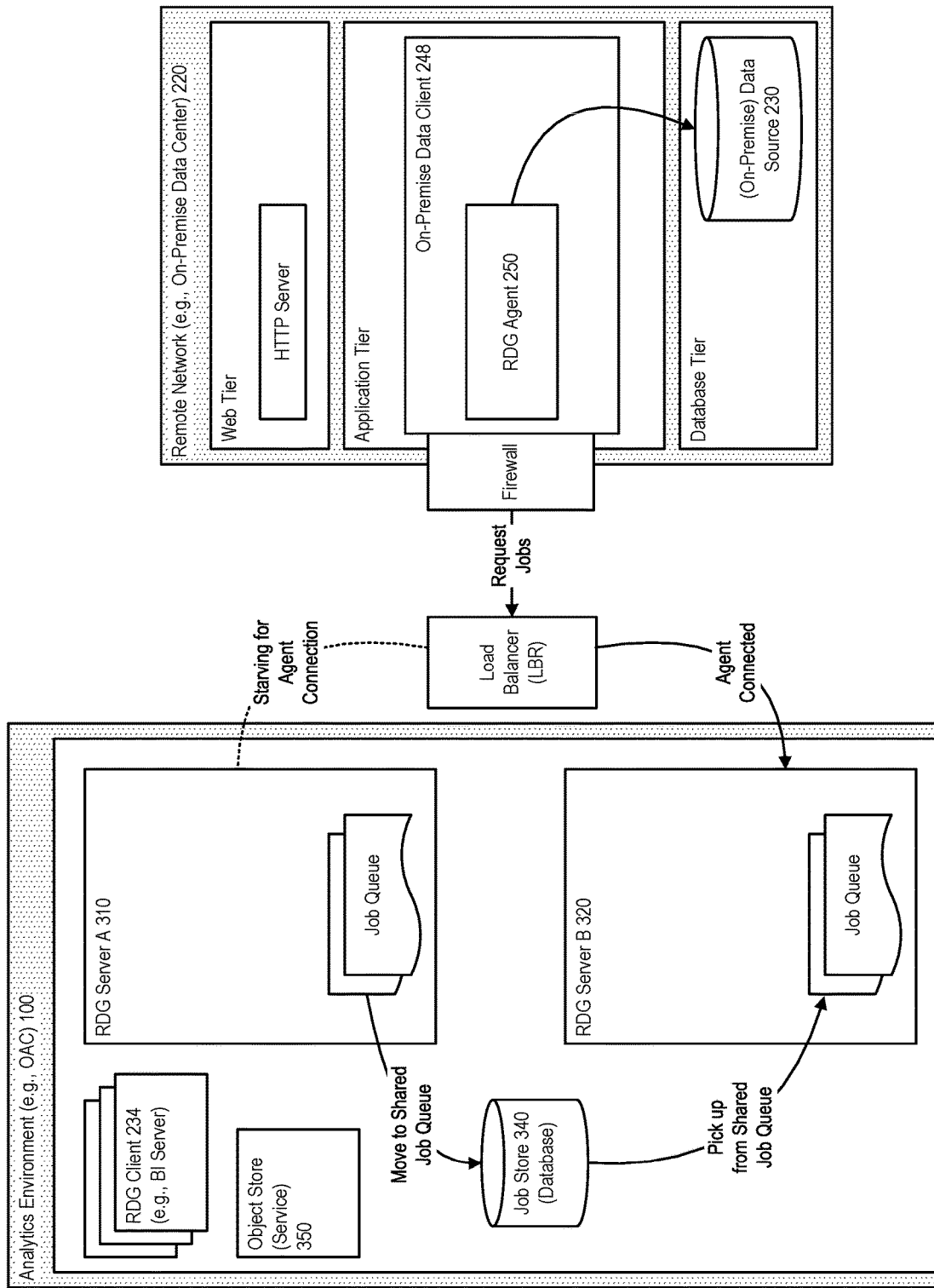
FIG. 12 further illustrates the use of a remote data gateway that supports peer routing with an analytics environment, in accordance with an embodiment.

FIG. 12 further illustrates the use of a remote data gateway that supports peer routing with an analytics environment, in accordance with an embodiment.

As illustrated in FIG. 12, in accordance with an embodiment, when a remote data gateway server, for example here, Server A, finds that jobs in its queue are starving, i.e., have not been picked up for execution for 10 seconds after submission, the server delegates these jobs to a remote queue—a shared resource, such as for example a table in a common database, available to all remote data gateway server instances.

In such a scenario, then a peer remote data gateway server, for example here, server B, that receives a connection from the remote data gateway agent requesting for jobs to execute, looks in its own queue, as well as this shared queue in the database table, for jobs. If it does find jobs in the shared queue, it picks up those jobs and assigns them to the remote data gateway agent for execution.

Figure 13:
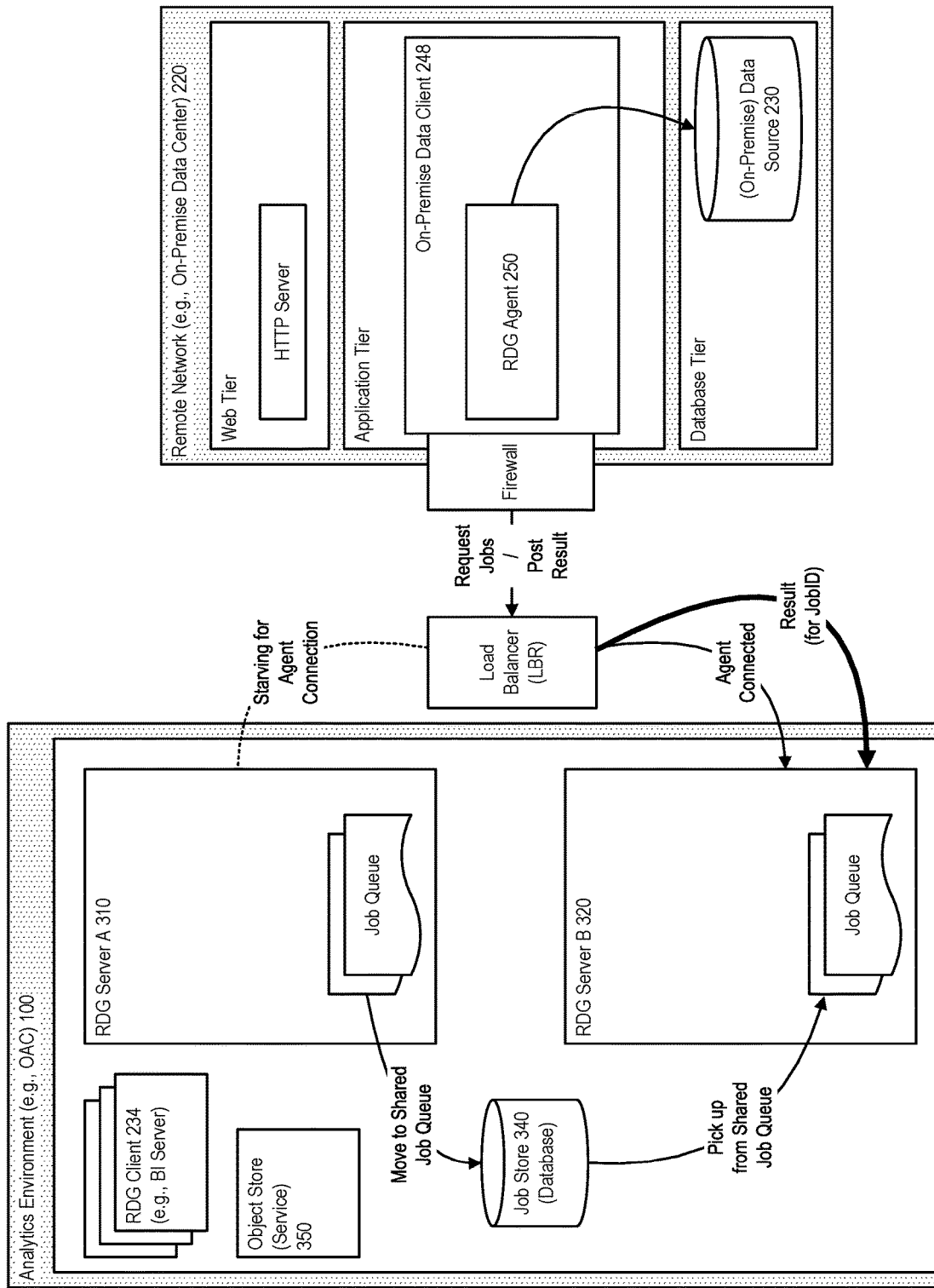
FIG. 13 further illustrates the use of a remote data gateway that supports peer routing with an analytics environment, in accordance with an embodiment.

FIG. 13 further illustrates the use of a remote data gateway that supports peer routing with an analytics environment, in accordance with an embodiment.

As illustrated in FIG. 13, in accordance with an embodiment, the remote data gateway agent executes the jobs and posts the results to server B, since that is the remote data gateway server that gave it the jobs for execution. Server B accepts the result, but cannot consume it, since it is not the remote data gateway server where the job was originally submitted, so it stores the result in a shared object store 340, via an object store service 350, and notifies all peer servers that a result for a routed job has arrived.

Figure 14:
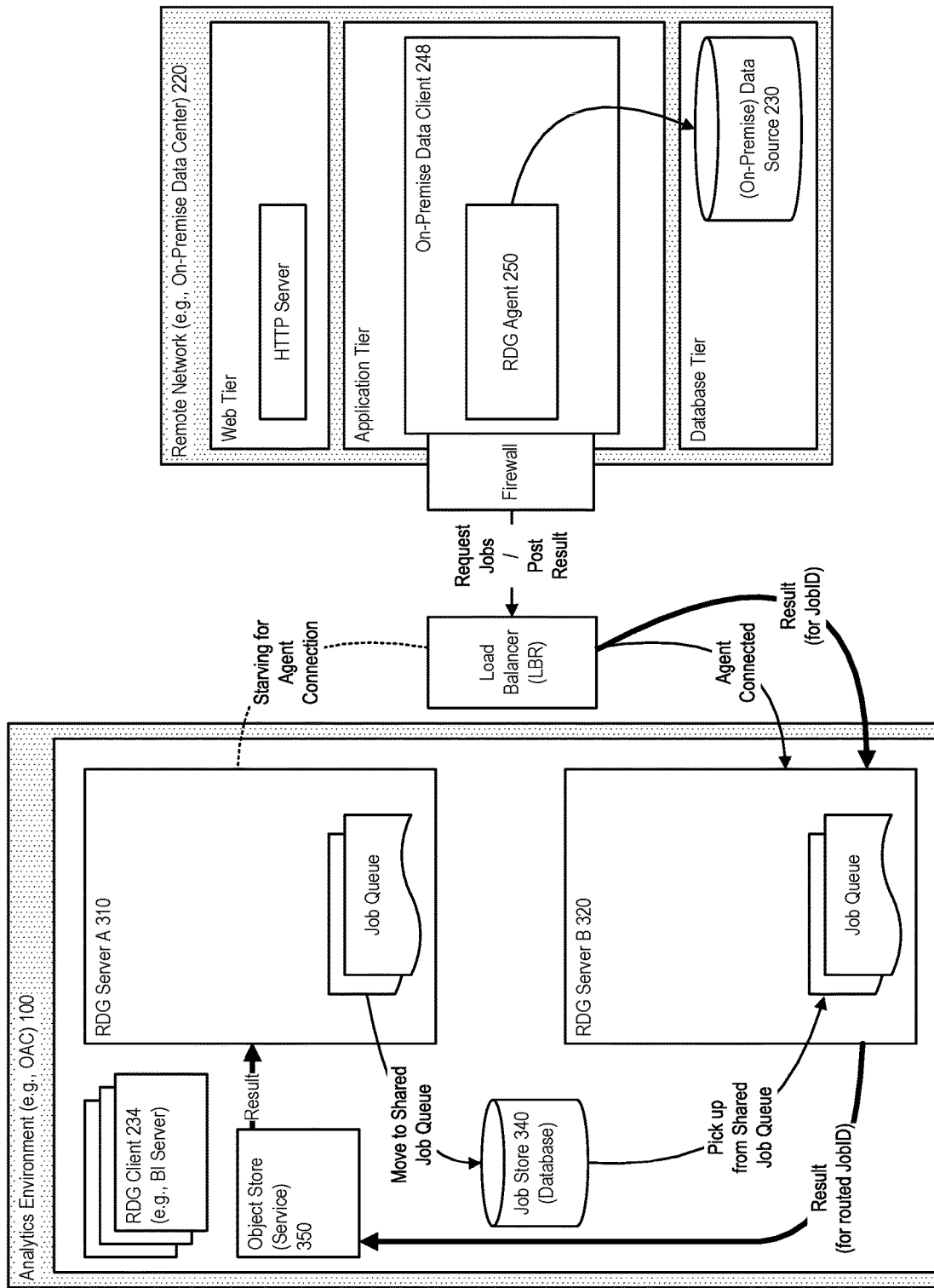
FIG. 14 further illustrates the use of a remote data gateway that supports peer routing with an analytics environment, in accordance with an embodiment.

FIG. 14 further illustrates the use of a remote data gateway that supports peer routing with an analytics environment, in accordance with an embodiment.

As illustrated in FIG. 14, in accordance with an embodiment, starving servers, that submitted jobs to the shared queue, check the shared object store to identify if the result belongs to them. For example, here if Server A finds that the result does belong to it (using the Job ID), then server A picks up the result, and consumes it for the job delegated by it.

However, a problem with this approach is it requires an additional hop and I/O for the result, in writing to and reading from the object store. In the above example, until server B receives and writes the full result to the object store as a complete object, then server A cannot start reading it.

Figure 15:
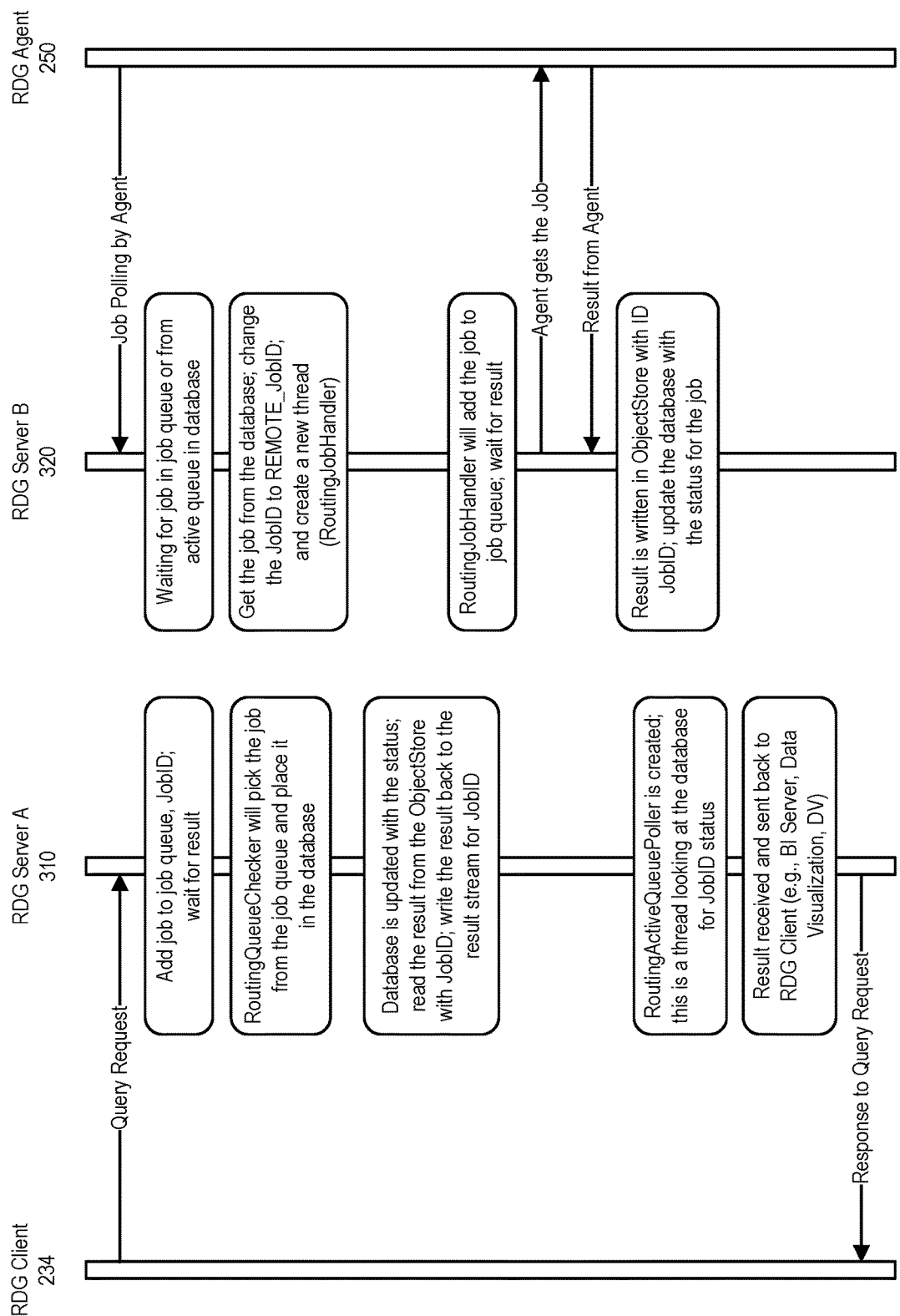
FIG. 15 illustrates an example sequence diagram associated with the use of a remote data gateway that supports peer routing with an analytics environment, in accordance with an embodiment.

FIG. 15 illustrates an example sequence diagram associated with the use of a remote data gateway that supports peer routing with an analytics environment, in accordance with an embodiment.

As illustrated in FIG. 15, in accordance with an embodiment, if a remote data gateway server cannot reach a particular data client at its remote data gateway agent, then it can determine which other clients it can get requests from. To address this, in accordance with an embodiment, the system can use a process of inverse proxy peer-to-peer routing—if a client has a request to be processed, but the server has not yet called into that client, then the client can hand off the request to a peer remote data gateway server, and the server can retrieve/process that request from that server operating as a proxy.

Figure 16:
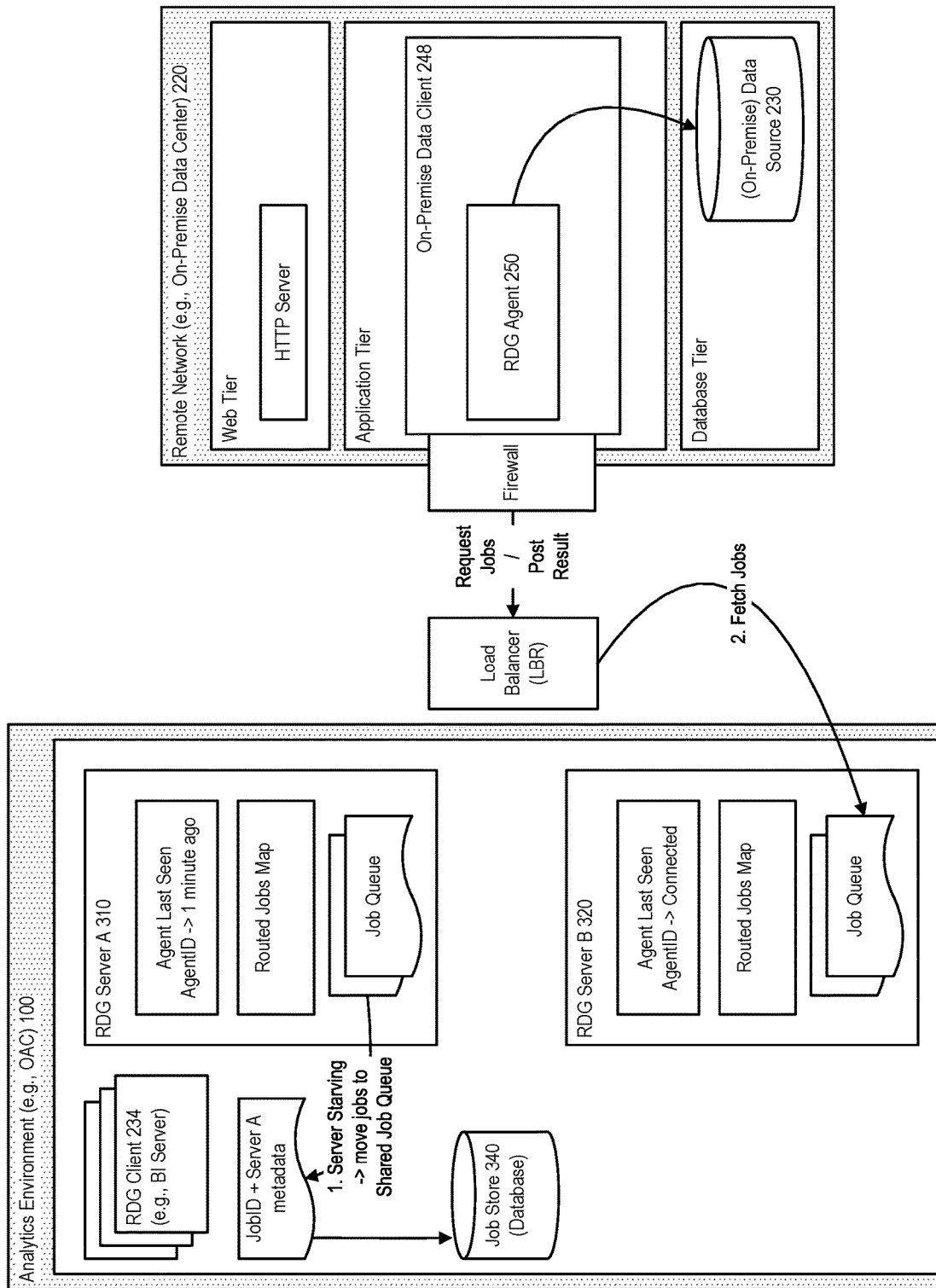
FIG. 16 illustrates the use of peer-to-peer routing with a remote data gateway that supports peer routing with an analytics environment, in accordance with an embodiment.

FIG. 16 illustrates the use of peer-to-peer routing with a remote data gateway that supports peer routing with an analytics environment, in accordance with an embodiment.

As illustrated in FIG. 16, in accordance with an embodiment, the described approach addresses the performance problem described above, b streaming result responses by replaying agent connections.

In accordance with an embodiment, jobs are still delegated and exchanged between servers using a shared storage, for example a database table—since we do not know which server has a current live connection or will receive the next connection from the remote data gateway agent. While moving a job to the shared queue, information about the remote data gateway server A—the server that submitted it (e.g., IP Address, Port, etc.) is added as job metadata.

Figure 17:
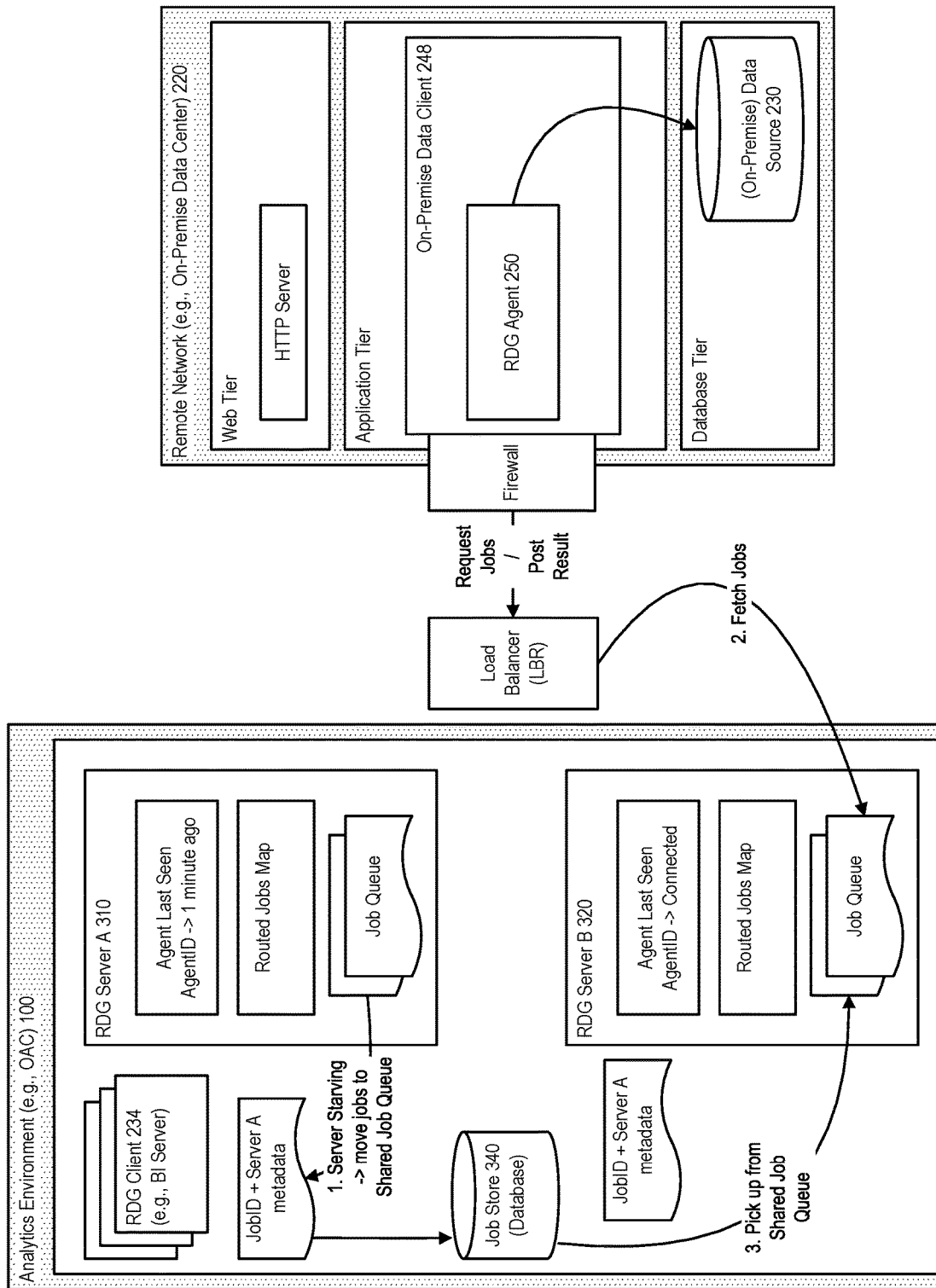
FIG. 17 further illustrates the use of peer-to-peer routing with a remote data gateway, in accordance with an embodiment.

FIG. 17 further illustrates the use of peer-to-peer routing with a remote data gateway, in accordance with an embodiment.

In accordance with an embodiment, once a job is picked up from the shared queue, the peer server—for example, server B—strips out this metadata and stores it in an internal map with the Job ID as the key, before delegating the job to an agent.

Figure 18:
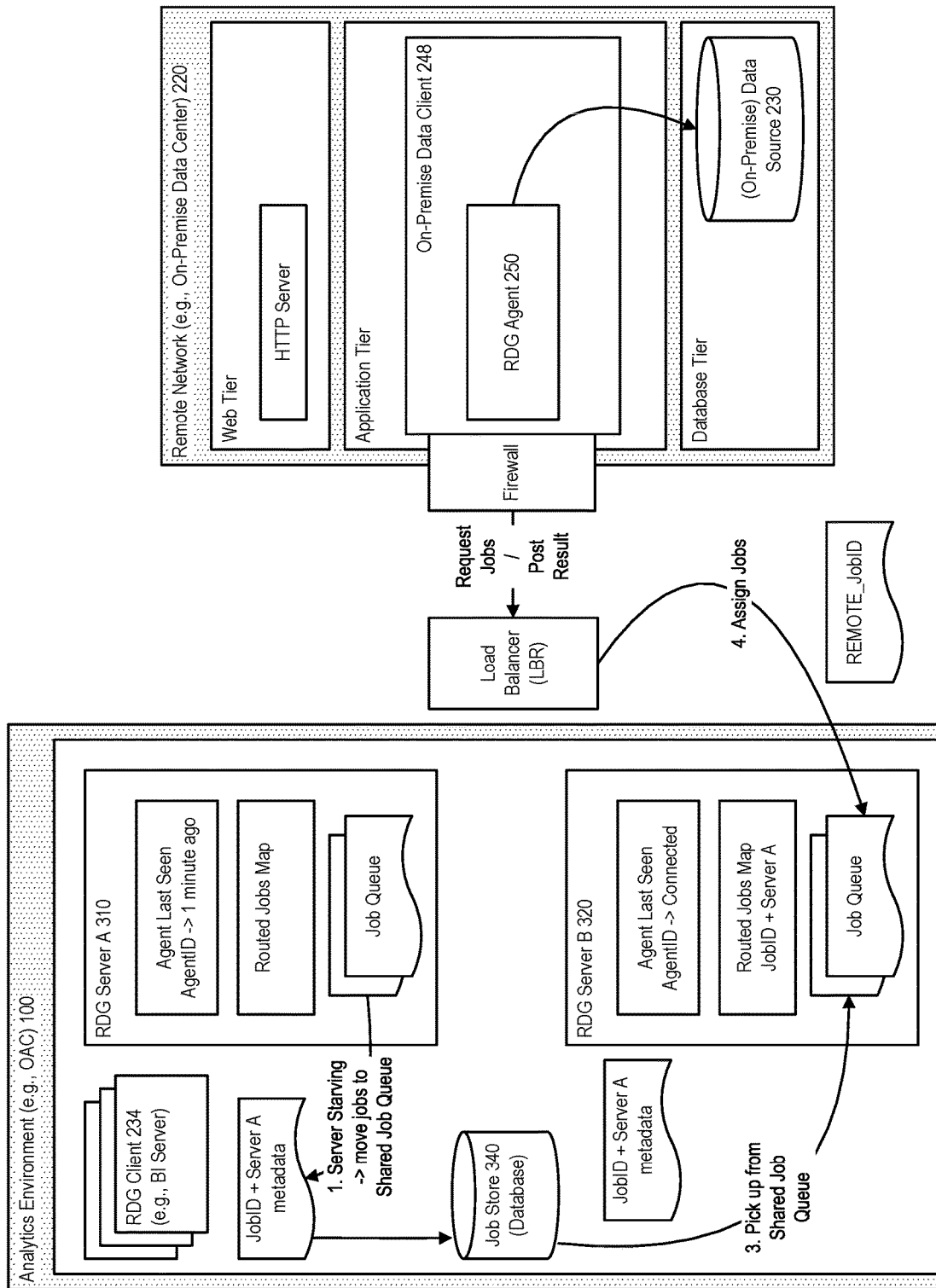
FIG. 18 further illustrates the use of peer-to-peer routing with a remote data gateway, in accordance with an embodiment.

FIG. 18 further illustrates the use of peer-to-peer routing with a remote data gateway, in accordance with an embodiment.

In accordance with an embodiment, the remote data gateway agent then executes the job and submits the result to, in this example, server B—the remote data gateway server that it picked up the job from.

Figure 19:
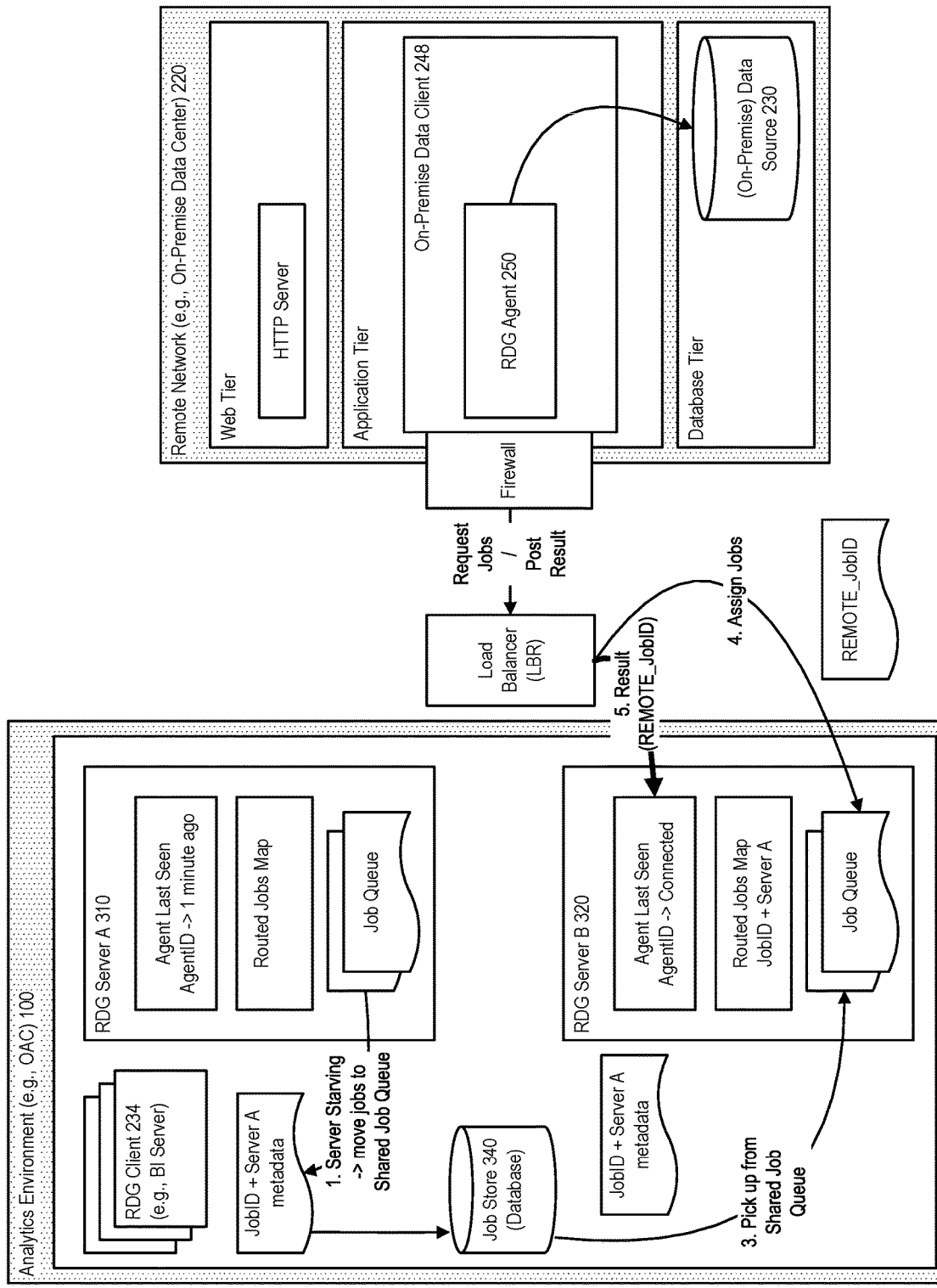
FIG. 19 further illustrates the use of peer-to-peer routing with a remote data gateway, in accordance with an embodiment.

FIG. 19 further illustrates the use of peer-to-peer routing with a remote data gateway, in accordance with an embodiment.

In accordance with an embodiment, the receiving remote data gateway server, in this example server B now looks at the Job ID, identifies it as a peer routing job, looks up the metadata of the originating server, in this example, server A—and then replays the result submission to server A, just as the remote data gateway agent would have.

Figure 20:
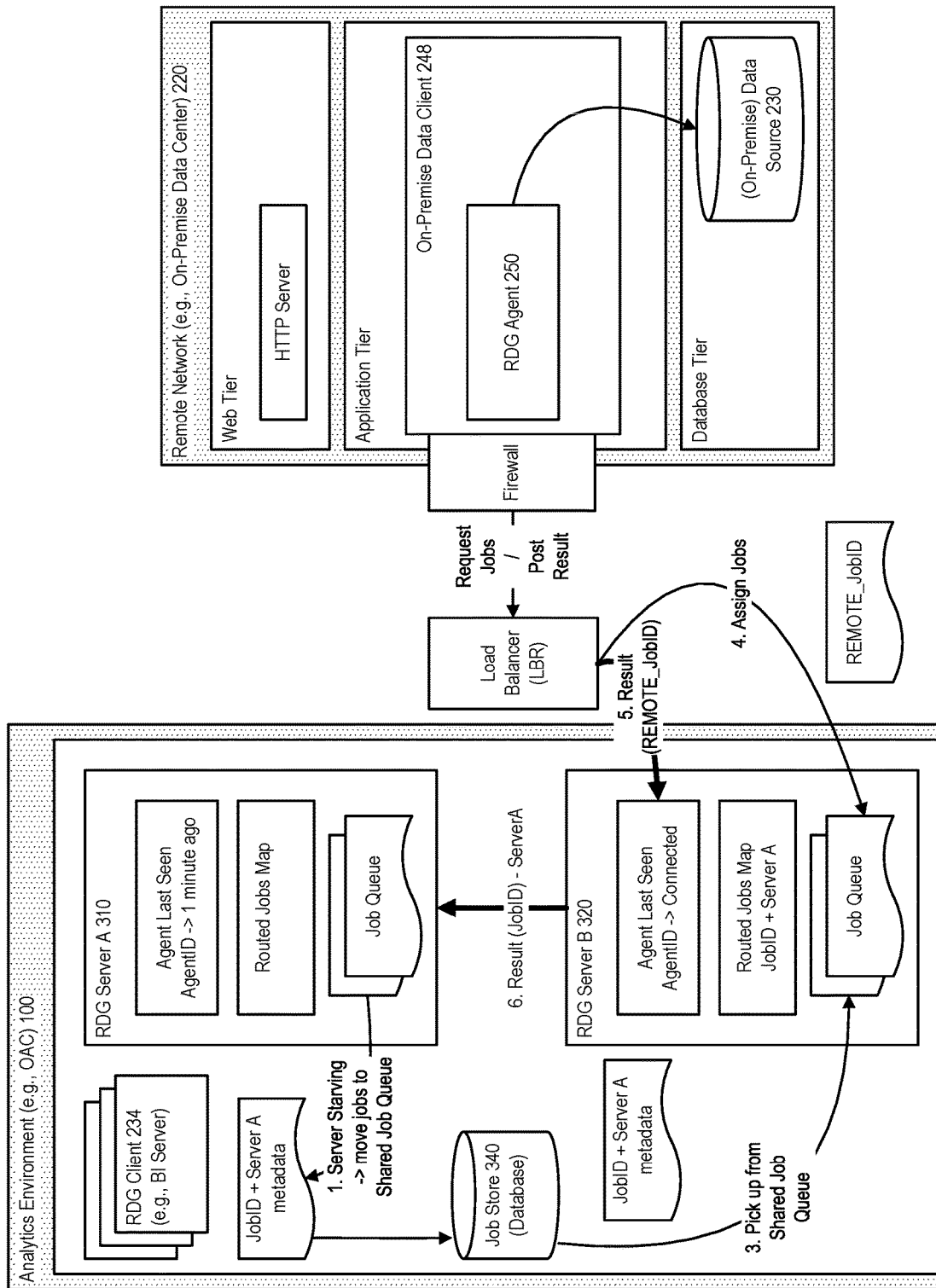
FIG. 20 further illustrates the use of peer-to-peer routing with a remote data gateway, in accordance with an embodiment.

FIG. 20 further illustrates the use of peer-to-peer routing with a remote data gateway, in accordance with an embodiment.

In accordance with an embodiment, the result, sent as a stream by the remote data gateway agent to server B is passed as a result stream to server A, without storing it anywhere in between, or sending out notifications for the result. The receiving remote data gateway server, server B in this example, acts like a proxy for the remote data gateway agent to submit the result to the original remote data gateway server, server A in this example.

Figure 21:
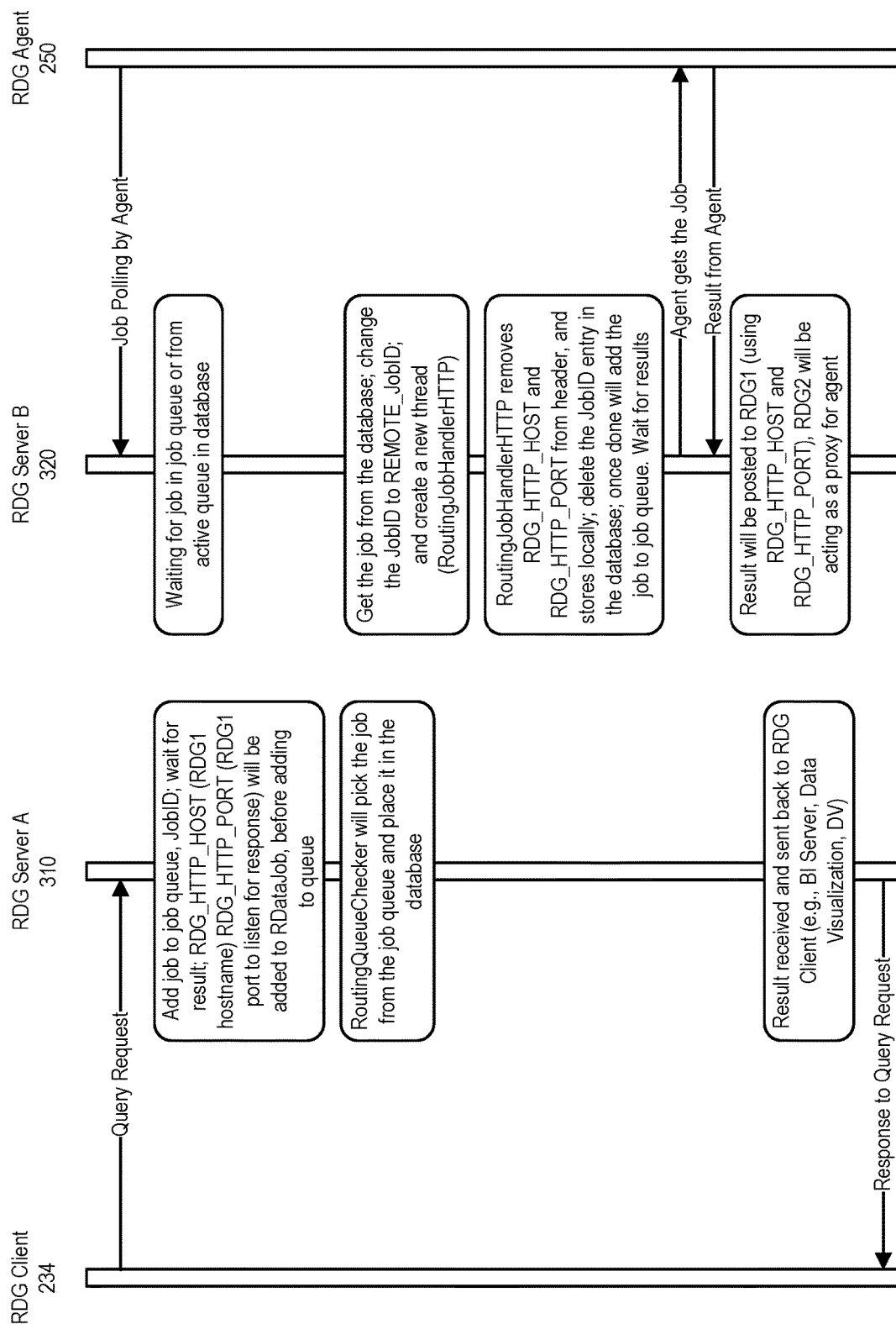
FIG. 21 illustrates an example sequence diagram associated with the use of a remote data gateway that supports peer routing with an analytics environment, in accordance with an embodiment.

FIG. 21 illustrates an example sequence diagram associated with the use of a remote data gateway that supports peer routing with an analytics environment, in accordance with an embodiment.

As illustrated in FIG. 21, in accordance with an embodiment, if a remote data gateway server cannot reach a particular data client at its remote data gateway agent, then it can determine which other clients it can get requests from. To address this, the system can use a process of inverse proxy peer-to-peer routing—if a client has a request to be processed, but the server has not yet called into that client, then the client can hand off the request to a peer remote data gateway server, and the server can retrieve/process that request from that server operating as a proxy.

Figure 22:
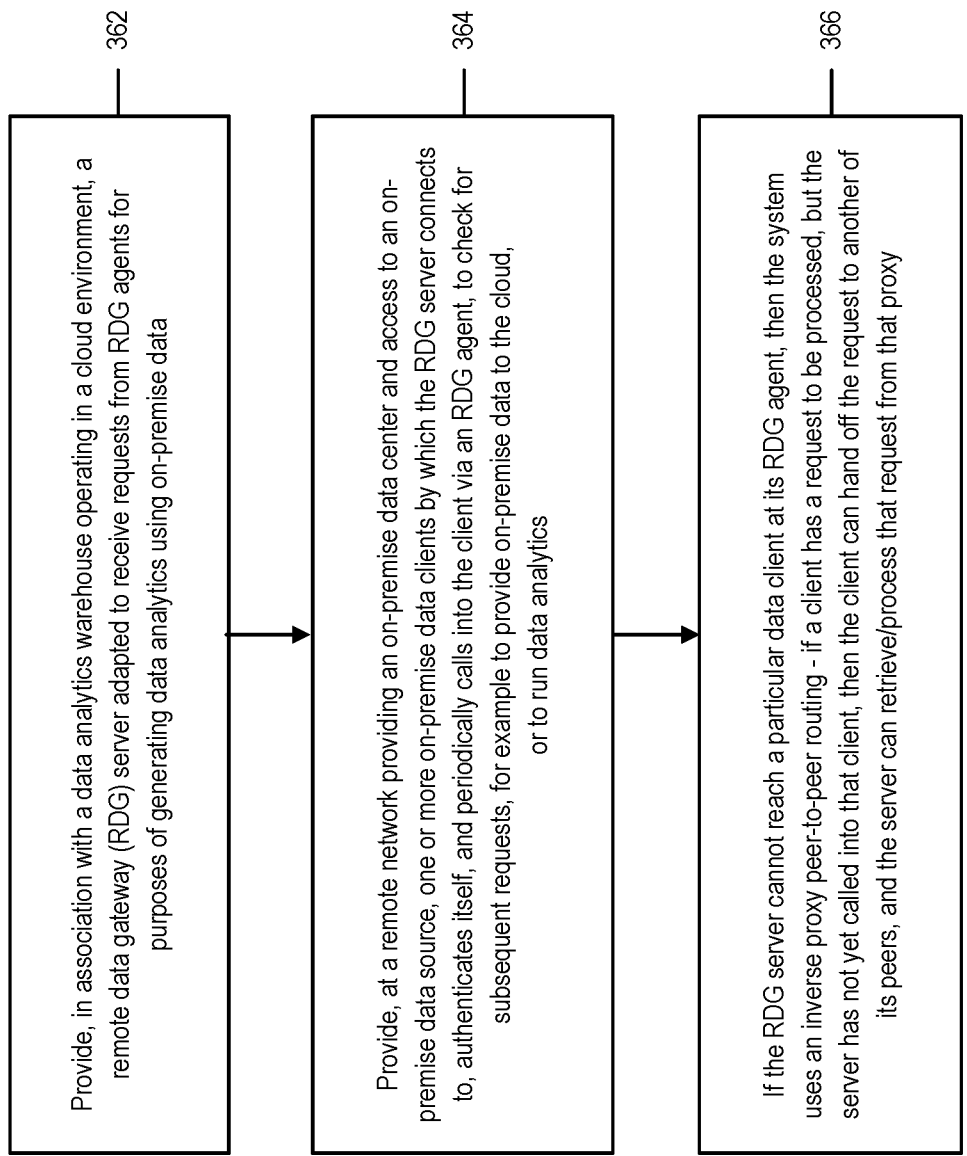
FIG. 22 illustrates a process for use of a remote data gateway that supports peer routing with an analytics environment, in accordance with an embodiment.

FIG. 22 illustrates a process for use of a remote data gateway that supports peer routing with an analytics environment, in accordance with an embodiment.

As illustrated in FIG. 22, in accordance with an embodiment, at step 362, in association with a data analytics warehouse operating in a cloud environment, a remote data gateway (RDG) server is adapted to receive requests from remote data gateway agents for purposes of generating data analytics using on-premise data.

At step 364, at a remote network providing an on-premise data center and access to an on-premise data source, one or more on-premise data clients are provided by which the remote data gateway server connects to, authenticates itself, and periodically calls into the client via a remote data gateway agent, to check for subsequent requests, for example to provide on-premise data to the cloud environment, or to run data analytics.

At step 366, if the remote data gateway server cannot reach a particular data client at its remote data gateway agent, then the system uses an inverse proxy peer-to-peer routing—if a client has a request to be processed, but the server has not yet called into that client, then the client can hand off the request to a peer remote data gateway server, and the server can retrieve/process that request from that server operating as a proxy.

Tracking Multi-Tenant Starvation

In accordance with an embodiment, the remote data gateway server maintains a timestamp for when the remote data gateway agent was last seen—to identify if the remote data gateway server is starving. For example, if an agent has not connected in the last 20 seconds, then the remote data gateway server assumes it is starving. In such an event, any new jobs that arrive, are immediately routed to the shared queue in the database. Each job does not wait to starve before being routed.

In accordance with an embodiment, in a multi-tenant environment, this timestamp is specific to a tenancy. This means remote data gateway agents for another tenant/customer could be connected to the remote data gateway server, but the remote data gateway server could still be starving for agents of a particular tenant.

Additionally, in accordance with an embodiment, if a tenant has multiple agents configured, then any one of them can pick up the jobs for execution. Not all agents of a tenant need to be connected simultaneously. A server can maintain a starvation map by tenancy—based on the remote data gateway agents that are connecting and requesting for jobs.

In accordance with various embodiments, the teachings herein may be conveniently implemented using one or more conventional general purpose or specialized computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the teachings herein can include a computer program product which is a non-transitory computer readable storage medium (media) having instructions stored thereon/in which can be used to program a computer to perform any of the processes of the present teachings. Examples of such storage mediums can include, but are not limited to, hard disk drives, hard disks, hard drives, fixed disks, or other electromechanical data storage devices, floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems, or other types of storage media or devices suitable for non-transitory storage of instructions and/or data.

The foregoing description has been provided for the purposes of illustration and description. It is not intended to be exhaustive or to limit the scope of protection to the precise forms disclosed. Many modifications and variations will be apparent to the practitioner skilled in the art.

For example, although several of the examples provided herein illustrate operation of an analytic applications environment with an enterprise software application or data environment such as, for example, an Oracle Fusion Applications environment; or within the context of a software-as-a-service (SaaS) or cloud environment such as, for example, an Oracle Analytics Cloud or Oracle Cloud Infrastructure environment; in accordance with various embodiments, the systems and methods described herein can be used with other types of enterprise software application or data environments, cloud environments, cloud services, cloud computing, or other computing environments.

The embodiments were chosen and described in order to best explain the principles of the present teachings and their practical application, thereby enabling others skilled in the art to understand the various embodiments and with various modifications that are suited to the particular use contemplated. It is intended that the scope be defined by the following claims and their equivalents.

What is claimed is:

1. A system for providing a remote data gateway for use with a data analytics environment, comprising:
   a computer including one or more processors, that provides access by an analytics environment to a data warehouse for storage of data, wherein the analytics environment comprises a remote data gateway server that operates to receive, from one or more remote data gateway clients, queries directed to an on-premise database provided at a remote network other than the analytics environment at which the remote data gateway server operates; and
   wherein the analytics environment communicates with a remote data gateway agent provided at the remote network that channels database queries received at the analytics environment and directed to the on-premise database, including that:
      the remote data gateway server at the analytics environment queues the queries that are received from the remote data gateway clients and are directed to the on-premise database;
      the remote data gateway agent provided at the remote network connects periodically, via a load balancer, to the remote data gateway server at the analytics environment to check for queries that are received from the remote data gateway clients and are queued at the remote data gateway server, to process;
      the remote data gateway server assigns, to the remote data gateway agent, a pending job from a queue of pending jobs maintained by the remote data gateway server;
      the remote data gateway agent provided at the remote network, in response to receiving the job from the remote data gateway server, connects to the on-premise database, and executes received queries as indicated by the job against the on-premise database; and
      the remote data gateway agent provided at the remote network returns query results to the analytics environment for use by the remote data gateway clients.

2. The system of claim 1, wherein the analytics environment is an analytics cloud environment.

3. The system of claim 1, wherein the analytics environment includes one or more software components operating as a control plane, and a data plane, and providing access to a data warehouse, or data warehouse instance.

4. The system of claim 1, wherein an on-premise data client exposes a port, which the remote data gateway server connects to, authenticates itself, and thereafter calls into periodically, via the remote data gateway agent, to provide on-premise data to the analytics cloud environment, or to run data analytics on the on-premise data.

5. The system of claim 1, wherein the remote data gateway agent connects to the analytics environment and asks for pending jobs, wherein at the analytics cloud environment, the remote data gateway server assigns a pending job from the queue of pending jobs maintained by the server together with metadata indicative of the remote data gateway client or remote data gateway agent associated with the job, and wherein the remote data gateway agent connects to the on-premise database, and executes a query provided by the job.

6. A method for providing a remote data gateway for use with a data analytics environment, comprising:
providing, at a computer including one or more processors, an analytics environment that provides access to a data warehouse for storage of data, wherein the analytics environment comprises a remote data gateway server that operates to receive, from one or more remote data gateway clients, queries directed to an on-premise database provided at a remote network other than the analytics environment at which the remote data gateway server operates; and
communicating by the analytics environment with a data gateway agent at the remote network that channels database queries received at the analytics environment and directed to the on-premise database, including that:
the remote data gateway server at the analytics environment queues the queries that are received from the remote data gateway clients and are directed to the on-premise database;
the remote data gateway agent provided at the remote network connects periodically, via a load balancer, to the remote data gateway server at the analytics environment to check for queries that are received from the remote data gateway clients and are queued at the remote data gateway server, to process;
the remote data gateway server assigns, to the remote data gateway agent, a pending job from a queue of pending jobs maintained by the remote data gateway server;
the remote data gateway agent provided at the remote network, in response to receiving the job from the remote data gateway server, connects to the on-premise database, and executes received queries as indicated by the job against the on-premise database; and
the remote data gateway agent provided at the remote network returns query results to the analytics environment for use by the remote data gateway clients.

7. The method of claim 6, wherein the analytics environment is an analytics cloud environment.

8. The method of claim 6, wherein the analytics environment includes one or more software components operating as a control plane, and a data plane, and providing access to a data warehouse, or data warehouse instance.

9. The method of claim 6, wherein an on-premise data client exposes a port, which the remote data gateway server connects to, authenticates itself, and thereafter calls into periodically, via the remote data gateway agent, to provide on-premise data to the analytics cloud environment, or to run data analytics on the on-premise data.

10. The method of claim 6, wherein the remote data gateway agent connects to the analytics environment and asks for pending jobs, wherein at the analytics cloud environment, the remote data gateway server assigns a pending job from the queue of pending jobs maintained by the server together with metadata indicative of the remote data gateway client or remote data gateway agent associated with the job, and wherein the remote data gateway agent connects to the on-premise database, and executes a query provided by the job.

11. A non-transitory computer readable storage medium having instructions thereon, which when read and executed by a computer including one or more processors cause the computer to perform a method comprising:
providing an analytics environment that provides access to a data warehouse for storage of data,
wherein the analytics environment comprises a remote data gateway server that operates to receive, from one or more remote data gateway clients, queries directed to an on-premise database provided at a remote network other than the analytics environment at which the remote data gateway server operates,
wherein the analytics environment communicates with a remote data gateway agent at the remote network that channels database queries received at the analytics environment and directed to the on-premise database, including that:
the remote data gateway server at the analytics environment queues the queries that are received from the remote data gateway clients and are directed to the on-premise database;
the remote data gateway agent provided at the remote network connects periodically, via a load balancer, to the remote data gateway server at the analytics environment to check for queries that are received from the remote data gateway clients and are queued at the remote data gateway server, to process;
the remote data gateway server assigns, to the remote data gateway agent, a pending job from a queue of pending jobs maintained by the remote data gateway server;
the remote data gateway agent provided at the remote network, in response to receiving the job from the remote data gateway server, connects to the on-premise database, and executes received queries as indicated by the job against the on-premise database; and
the remote data gateway agent provided at the remote network returns query results to the analytics environment for use by the remote data gateway clients.

12. The non-transitory computer readable storage medium of claim 11, wherein the analytics environment is an analytics cloud environment.

13. The non-transitory computer readable storage medium of claim 11, wherein the analytics environment includes one or more software components operating as a control plane, and a data plane, and providing access to a data warehouse, or data warehouse instance.

14. The non-transitory computer readable storage medium of claim 11, wherein an on-premise data client exposes a port, which the remote data gateway server connects to, authenticates itself, and thereafter calls into periodically, via the remote data gateway agent, to provide on-premise data to the analytics cloud environment, or to run data analytics on the on-premise data.

15. The non-transitory computer readable storage medium of claim 11, wherein the remote data gateway agent connects to the analytics environment and asks for pending jobs, wherein at the analytics cloud environment, the remote data gateway server assigns a pending job from the queue of pending jobs maintained by the server together with metadata indicative of the remote data gateway client or remote data gateway agent associated with the job, and wherein the remote data gateway agent connects to the on-premise database, and executes a query provided by the job.

16. The system of claim 1, wherein the remote data gateway server communicates with the remote data gateway agent deployed behind a firewall on the remote network that includes the on-premise database, wherein the remote data gateway server connects to a port exposed by the on-premise data client, and thereafter calls into the client periodically, via the remote data gateway agent, to check for requests directed to on-premise data.

17. The system of claim 1, wherein the remote data gateway client propagates a connection metadata, which identifies a source of jobs for remote data gateway agents, and is used by the remote data gateway server to maintain a state of the jobs;
    wherein the remote data gateway agent posts result sets for the jobs to the analytics cloud environment via the remote data gateway server, wherein the analytics cloud environment consumes the result sets in rendering visualizations, reports, or dashboards.

18. The system of claim 1, wherein the remote data gateway agent includes a pool of poller threads for polling the remote data gateway server, and a pool of executor threads for executing jobs, wherein the poller thread pool operates to check for pending jobs on the remote data gateway server, while the executor thread pool operates to execute assigned jobs and post results back to the remote data gateway server.

19. The method of claim 6, wherein the remote data gateway server communicates with the remote data gateway agent deployed behind a firewall on the remote network that includes the on-premise database, wherein the remote data gateway server connects to a port exposed by the on-premise data client, and thereafter calls into the client periodically, via the remote data gateway agent, to check for requests directed to on-premise data;
    wherein the remote data gateway client propagates a connection metadata, which identifies a source of jobs for remote data gateway agents, and is used by the remote data gateway server to maintain a state of the jobs;
    wherein the remote data gateway agent posts result sets for the jobs to the analytics cloud environment via the remote data gateway server, wherein the analytics cloud environment consumes the result sets in rendering visualizations, reports, or dashboards.

20. The non-transitory computer readable storage medium of claim 11, wherein the remote data gateway server communicates with the remote data gateway agent deployed behind a firewall on the remote network that includes the on-premise database, wherein the remote data gateway server connects to a port exposed by the on-premise data client, and thereafter calls into the client periodically, via the remote data gateway agent, to check for requests directed to on-premise data;
    wherein the remote data gateway client propagates a connection metadata, which identifies a source of jobs for remote data gateway agents, and is used by the remote data gateway server to maintain a state of the jobs;
    wherein the remote data gateway agent posts result sets for the jobs to the analytics cloud environment via the remote data gateway server, wherein the analytics cloud environment consumes the result sets in rendering visualizations, reports, or dashboards.

\* \* \* \* \*